United States Patent
Hunt et al.

(10) Patent No.: US 11,361,149 B2
(45) Date of Patent: *Jun. 14, 2022

(54) TECHNIQUES FOR WEB FRAMEWORK DETECTION

(71) Applicant: Microsoft Technology Licensing, LLC, Redmond, WA (US)

(72) Inventors: Adam Hunt, El Cerrito, CA (US); Jonas Edgeworth, San Francisco, CA (US); Chris Kiernan, San Francisco, CA (US); David Pon, Sunnyvale, CA (US); Elias Manousos, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/131,620

(22) Filed: Dec. 22, 2020

(65) Prior Publication Data

US 2021/0110101 A1   Apr. 15, 2021

Related U.S. Application Data

(63) Continuation of application No. 16/506,968, filed on Jul. 9, 2019, now Pat. No. 10,872,196, which is a (Continued)

(51) Int. Cl.
*G06F 40/143* (2020.01)
*G06F 16/958* (2019.01)
(Continued)

(52) U.S. Cl.
CPC .......... *G06F 40/143* (2020.01); *G06F 16/958* (2019.01); *G06F 40/14* (2020.01);
(Continued)

(58) Field of Classification Search
CPC ...... G06F 40/14; G06F 40/197; G06F 40/205; G06F 16/958; G06F 40/143; H04L 9/3239
See application file for complete search history.

(56) References Cited

U.S. PATENT DOCUMENTS 6,470,329 B1   10/2002   Livschitz
7,082,454 B1   7/2006   Gheith
(Continued)

OTHER PUBLICATIONS

"Apache Subversion", Wikipedia, Available at: https://en.wikipedia.org/wiki/Apache_Subversion, 2000, 11 pages; retrieved on May 25, 2017.

(Continued)

*Primary Examiner* — Asher D Kells
(74) *Attorney, Agent, or Firm* — Wade IP Law PLLC

(57) ABSTRACT

Techniques are disclosed for analyzing documents to detect web components and the web frameworks in the documents. In at least one embodiment, a network analysis system is provided to passively detect web frameworks of documents. The network analysis system can render a document using a document object model to identify objects in the document that are defined as web components. A hash function may be applied to each of the objects to generate a hash signature for the object. Files defining web frameworks can be downloaded from a repository system. Each file may corresponding to a web component. A hash function is applied content in each file to generate a hash signature. The hash signatures of each file may be compared to the hash signatures of the objects in the document to identify a web component for each object. A web framework can be identified based on the web components.

20 Claims, 8 Drawing Sheets

Related U.S. Application Data continuation of application No. 15/497,994, filed on Apr. 26, 2017, now Pat. No. 10,346,520.

(60) Provisional application No. 62/327,986, filed on Apr. 26, 2016.

(51) Int. Cl.
*G06F 40/205* (2020.01)
*G06F 40/14* (2020.01)
*H04L 9/32* (2006.01)
*G06F 40/197* (2020.01)

(52) U.S. Cl.
CPC .......... *G06F 40/205* (2020.01); *H04L 9/3239* (2013.01); *G06F 40/197* (2020.01)

(56) References Cited

U.S. PATENT DOCUMENTS

| | | | |
|---|---|---|---|
| 8,081,824 B2 | 12/2011 | Li et al. | |
| 8,655,913 B1 | 2/2014 | Shah et al. | |
| 8,943,588 B1 | 1/2015 | Speegle et al. | |
| 9,158,518 B2 | 10/2015 | Brown et al. | |
| 9,386,037 B1 | 7/2016 | Hunt et al. | |
| 9,798,650 B1 | 10/2017 | Verma | |
| 2004/0107214 A1 | 6/2004 | Hung et al. | |
| 2005/0033768 A1 | 2/2005 | Sayers et al. | |
| 2005/0050016 A1 | 3/2005 | Stanoi et al. | |
| 2005/0055343 A1 | 3/2005 | Krishnamurthy | |
| 2006/0294199 A1 | 12/2006 | Bertholf | |
| 2007/0239756 A1 | 10/2007 | Li et al. | |
| 2007/0244920 A1 | 10/2007 | Palliyil et al. | |
| 2009/0307256 A1 | 12/2009 | Tiyyagura | |
| 2010/0088676 A1 | 4/2010 | Yuan et al. | |
| 2010/0100743 A1 | 4/2010 | Ali et al. | |
| 2010/0162229 A1* | 6/2010 | Tsuk | G06F 9/44526 717/175 |
| 2010/0318892 A1 | 12/2010 | Teevan et al. | |
| 2011/0093701 A1 | 4/2011 | Etchegoyen | |
| 2011/0258532 A1 | 10/2011 | Ceze et al. | |
| 2012/0131139 A1 | 5/2012 | Siripurapu et al. | |
| 2012/0284270 A1 | 11/2012 | Lee et al. | |
| 2013/0086677 A1 | 4/2013 | Ma et al. | |
| 2013/0311496 A1 | 11/2013 | Fedorenko et al. | |
| 2013/0332444 A1 | 12/2013 | Kondratova et al. | |
| 2014/0019847 A1* | 1/2014 | Osmak | G06F 40/174 715/234 |
| 2014/0283067 A1 | 9/2014 | Call et al. | |
| 2015/0046915 A1 | 2/2015 | Oliver et al. | |
| 2015/0106157 A1 | 4/2015 | Chang et al. | |
| 2015/0186342 A1 | 7/2015 | Tripp | |
| 2015/0234885 A1 | 8/2015 | Weinstein et al. | |
| 2015/0287047 A1 | 10/2015 | Situ et al. | |
| 2016/0012226 A1 | 1/2016 | Smith et al. | |
| 2016/0112284 A1 | 4/2016 | Pon et al. | |
| 2016/0127409 A1* | 5/2016 | Wurth | H04L 67/06 726/25 |
| 2017/0031574 A1* | 2/2017 | Dhawal | G06F 40/186 |
| 2017/0099319 A1 | 4/2017 | Hunt et al. | |
| 2017/0308513 A1 | 10/2017 | Hunt et al. | |
| 2018/0336279 A1* | 11/2018 | Ahern | G06F 16/9535 |
| 2019/0332651 A1 | 10/2019 | Hunt et al. | |
| 2020/0004880 A1* | 1/2020 | Sharshevsky | G06F 16/9566 |

OTHER PUBLICATIONS

"Collaborating On GitHub With Subversion", GitHub, Available at: https://github.com/blog/1178-collaborating-on-github-with-subversion, 2017, 4 pages; retrieved on May 25, 2017.

"Common Vulnerabilities And Exposures", Available at https://cve.mitre.org/about/, 1999-2017, 6 pages, retrieved on May 25, 2017.

"Document Object Model—Wikipedia, The Free Encyclopedia", Sep. 19, 2016.

"Drupal—Open Source CMS", Available at: https://www.drupal.org/, 2017, 6 pages; retrieved on May 25, 2017.

"Enterprise-Class Centralized Version Control For The Masses", Apache Subversion, Available at: https://subversion.apache.org/, 2011, 2 pages; retrieved on May 25, 2017.

"GitHubGist", Mar. 2007, Integer Hash Function, Version 3.1, https://gist.github.com/badboy/6267743(GitHubGist_Inthash.pdf), pp. 1-6.

"Web Application Frameworks—GitHub", retrieved from internet: https://github.com/showcases/web-application-frameworks, 2017, 4 pages: retrieved on May 25, 2017.

"Web Framework", Wikipedia, Available At: https://en.wikipedia.org/wiki/Web_framework, 1993, 7 pages; retrieved on May 25, 2017.

United States Patent and Trademark Office, U.S. Appl. No. 15/497,994, Final Office Action dated Dec. 14, 2017.

United States Patent and Trademark Office, U.S. Appl. No. 15/497,994, Non-Final Office Action dated Jun. 21, 2017.

United States Patent and Trademark Office, U.S. Appl. No. 15/497,994, Non-Final Office Action dated Jun. 29, 2018.

United States Patent and Trademark Office, U.S. Appl. No. 15/497,994, Notice of Allowance dated Feb. 27, 2019.

United States Patent and Trademark Office, U.S. Appl. No. 16/506,968, Non-Final Office Action dated May 6, 2020.

United States Patent and Trademark Office, U.S. Appl. No. 16/506,968, Notice of Allowance dated Aug. 19, 2020.

World Intellectual Property Organization, Application No. PCT/US17/29643, International Search Report dated Jul. 10, 2017.

* cited by examiner

▼ Data  Resolutions (194) WHOIS (8) Subdomains (252) Trackers (1000) Components (1000) Host Pairs (2000) OSINT (10) DNS (21) Projects (3) — 402

FILTERS — 406

| CATEGORY (19/1,000) | |
|---|---|
| ✓ ⊗ Tracking Pixel | 960 |
| ✓ ⊗ Server | 10 |
| ✓ ⊗ Analytics Service | 9 |
| ✓ ⊗ Ad Network | 1 |
| ✓ ⊗ Advertising | 1 |
| ✓ ⊗ CDN | 1 |
| ✓ ⊗ DSP | 1 |
| ✓ ⊗ Publisher | 1 |

COMPONENTS — 404

○ ▼ Show: 25   1-25 of 1,000 ▼   Sort: Last Seen Descending ▼   Download  Copy

| | Hostname | First | Last | Category | Value | Tags | |
|---|---|---|---|---|---|---|---|
| ☐ | adtags.corp.net | 2014-10-20 | 2017-04-18 | Advertising | BrightRoll | ⊞Registered | ⊘link |
| ☐ | adtags.corp.net | 2014-11-24 | 2017-04-18 | Analytics Service | Nielsen | | |
| ☐ | adtags.corp.net | 2014-10-20 | 2017-04-18 | DSP | Chango | ⊞Registered | ⊘link |
| ☐ | adtags.corp.net | 2015-11-20 | 2017-04-18 | Tracking Pixel | Adobe Marketing Cloud | ⊞Registered | ⊘link |
| ☐ | adtags.corp.net | 2015-04-07 | 2017-04-18 | CDN | Yahoo! CDN | ⊞Registered | ⊘link |
| ☐ | discovery.corp.net | 2016-08-20 | 2017-04-18 | Server | AmazonS3 | ⊞Registered | ⊘link |
| ☐ | adtags.corp.net | 2016-10-04 | 2017-04-18 | Tracking Pixel | aa.agkn.com | ⊞Registered | ⊘link |

TECHNIQUES FOR WEB FRAMEWORK DETECTION

PRIORITY CLAIM

This application claims the benefit as a Continuation of U.S. application Ser. No. 16/506,968, filed Jul. 9, 2019, which claims benefit as a Continuation of U.S. application Ser. No. 15/497,994, filed Apr. 26, 2017, now U.S. Pat. No. 10,346,520, issued Jul. 9, 2019, which claims benefit of Provisional Application Ser. No. 62/327,986, filed Apr. 26, 2016 the entire contents of the foregoing are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

BACKGROUND

As the use of the Internet and the amount of information available on the Internet has expanded, the ability to track and monitor information available over the Internet related to a particular subject or associated with a particular entity has been negatively impacted. The vast amount of information present on the Internet makes monitoring websites nearly impossible as it is difficult to quickly and efficiently compare the large amount of information contained within the large number of websites that may be associated with an entity. These challenges extend to the enterprise environment, in which an enterprise is faced with the burden of monitoring thousands of web documents accessed throughout an enterprise network including enterprise websites. In an enterprise system having thousands of electronic documents (e.g., documents provided via a website), compliance and security of the enterprise network and the enterprise website becomes difficult to manage.

Of the many challenges faced with network security in any type of computing system (e.g., enterprise system or a cloud computing system), web documents for a website may compromise the security of the enterprise system. Electronic documents for a website may include or implement one or more web components, designed to support a web-based feature, such as content management. For example, web documents may be designed to support a web framework for managing content provided for the web document. The web framework may be defined by multiple, different types of web components. Examples of web frameworks may include proprietary solutions such as WordPress®, Drupal®, Joomla®, and Concrete5®. A web component in an electronic document for a website may undergo several versions through its lifetime. The versions of a website can correspond to changes in a web component due to version changes in a web framework using the web component. The changes in the versions may be difficult to track for a large website. An entity managing a website hosting many web documents may desire to consolidate different web frameworks, or even different versions of web frameworks. The consistency in web frameworks for a website may enable users that manage the website (e.g., an administrator or an operations analyst) to better manage security and operations of a website. By limiting and identifying web framework usage, the security and operation of a website can be improved. Some web components and/or web frameworks may have or expose security vulnerabilities to a website that may go undetected if not discovered in the website. Some websites may implement multiple different web frameworks, each of which may have shared or conflicting vulnerabilities. Some vulnerabilities of a web framework may be exposed by an older version that enable malicious third parties to hide malicious code from an entity's domain names without such entity knowing that any changes have occurred or that such domains have been taken over by malicious code. As such, it is difficult to ensure that bad actors are not altering, misappropriating, and/or otherwise compromising or exploiting data, including ways that interfere with privacy, or damage an entity's intangible business assets, such as intellectual property and goodwill.

Accordingly, businesses are challenged to find ways to accurately and periodically identify and detect changes in a web framework and/or web components of documents hosted by a website. Detecting changes in a web document, in particular web framework changes, becomes paramount in dealing with security of a network, such as a network within an enterprise system. Many web frameworks provide a publicly accessible file in an administrative directory that contains the exact version installed. Using targeted (or active) crawling, the file can be downloaded and the version of the framework determined with little trouble. However, this method may not be reliable. First, the file may not be accessible via the public Internet. Removing or protecting this file from being read by external visitors to the site is a common practice. Secondly, some frameworks may not provide such files. Either way, these files are not typically requested through normal crawling or browsing. Requesting these files, whether they exist or not, should raise suspicion of the system administrator and security team, and may be considered obtrusive.

BRIEF SUMMARY

Embodiments of the present disclosure are directed to techniques for analyzing documents (e.g., a web document of a website) to detect web components and the web frameworks of the documents. Specifically, the techniques may include analyzing documents communicated across a network. In at least one embodiment, a network analysis system is provided to passively monitor and detect changes in web frameworks of documents. In view of the foregoing challenges, it is desirable to be able to identify the web frameworks implemented for a website. Techniques disclosed implement passive, rather than obtrusive and unreliable methods of detecting web frameworks, and more specifically, web components implemented for documents.

The network analysis system can determine information that provides a digital footprint of a website including accurate and real-time determination of web components and web frameworks used on the website. The network analysis system can determine fine grain web component detection that includes both name and version information. The ability to identify and monitor changes in web frameworks implemented for a set of documents of a website may be useful for identification and analysis of web frameworks for security vulnerabilities, consolidation and management, and operations of the website. Given the number of different types of components and web frameworks, prior art systems may not be able to reliably detect web frameworks of documents on a website that may continuously change. This is especially important when system administrators and other security experts are faced with a new common vulnerabilities and exposure (CVE). They may need to identify which servers for a website that require immediate attention based on the web frameworks used for the website. For instance, if several of their servers are running a vulnerable version of a web framework, they should be aware of it before it is compromised. Determining a current version of a web framework can enable an enterprise to ensure consistent compliance with secure web frameworks throughout the website.

In at least one embodiment, a version of a web framework can be detected, or at least closely approximated for a website. Passive techniques may be used to prevent use of unreliable and obtrusive probing into a website's servers. Network analysis system can access (e.g., download) information about web frameworks from a repository system. The information about web frameworks may include source code or data defining different web components. The information may be downloaded in multiple files, each file corresponding to a unique web component. A hash function may be applied to generate a hash value (a "hash signature") for each web component downloaded from the repository system. These hash signatures are then stored in a data store with information about the web component and the name and version of the web framework including the web component.

To monitor a website, network analysis system can crawl the website by implementing program code (e.g., a bot). The program code may mimic a behavior of a web application (e.g., a browser) to access documents (e.g., web pages) from a website. The program code can process the structure of a document, and initiate requests (e.g., dependent requests) for web components for rendering the document. The program code can capture the response(s) to each request for comparison with known web components to determine a web framework.

To compare the response of each request with known web components, the network analysis system can generate a hash signature, using a hash function, for the response. A data store can be queried for the hash signatures of each of the known web components to identify the files matching the hash signatures of the requests. Each file may correspond to a hash signature of a web component. The file may be associated with one or more web frameworks. The name and version information for a web framework can be identified based on the web components corresponding to the hash signatures of files that match responses for those web components. This process can be repeated for each document, or an entire website for which responses are captured for requests for components.

The results of identifying the web framework based on matching files are grouped. For each web framework identified, the network analysis system can compare the sets of possible web framework versions identified. The network analysis system can deduce the version for a web framework by finding the intersection of all of the sets. When the intersection of the sets contains more than one candidate version, the network analysis system can reduce the version precision by one level until the versions in the set of candidate versions agree (patch to minor, followed by minor to major). Web frameworks with insufficient statistical significance can be discarded.

In some embodiments, network analysis system may provide one or more graphical interfaces to provide information about web components and/or web frameworks that have been identified for a document, or a web site. Network analysis system may be implemented with a system that provides information about network assets. The information about a web component and/or web frameworks can be displayed with a web page (e.g., a web document) accessed or associated with a network asset. Network analysis system can maintain a data store of detected web components and web frameworks so as to track changes, if any, in either of the web components or web frameworks. Often times, websites change and/or web frameworks change, exposing or curing vulnerabilities and problems with implementation of web frameworks. The collection of changes to web components and web frameworks may be useful for determining vulnerabilities and problems with a website in real-time. Network analysis system can display information about changes to web components and web frameworks, and when those changes were detected. The information can be used to correlate a trend in malicious network activity and/or operational problems with changes in a web framework. In some embodiments, the network analysis system can communicate with one or more third party sources to obtain information about web components and web frameworks. Such information may include a name, a version, and a rating (e.g., a common vulnerabilities and exposures (CVE)) or score about the security and/or stability of the web components and the web frameworks in which they are associated.

Some embodiments may be implemented by a computing system that is configured to implement methods and operations described herein. Yet some embodiments relate to systems, computer products, and machine-readable tangible storage media which employ or store instructions for methods and operations described herein. Systems may include one or more processors and memory. Systems may include a computer product, machine-readable tangible storage media, modules, or a combination thereof to perform methods and operations described herein.

A method may include determining, using a document object model (DOM) to render a document obtained from a server computer, a plurality of objects in the document. Each of the plurality of objects may be defined as one of a plurality of web components. The method may include sending requests for the plurality of objects. Each of the requests for a web component may define a different object in the plurality of objects. The method may include obtaining responses for the requests. Each of the responses correspond to a different request of the requests. Each of the responses includes data for the web component defining the different object. The method may include generating a plurality of hash values. Each of the hash values may be generated for a different response of the responses. Each of the hash values may be generated by applying a hash function to the different response of the responses. The method may include comparing each of the hash values to a plurality of hash signatures. Each of the plurality of hash signatures may be generated by applying the hash function to a different web component of a plurality of web components. The method may include identifying a set of web components in the plurality of web components. Each web component in the set of web components may be identified by having a different hash signature that matches a different one of the hash values using the comparing. The different hash signature may be one of the plurality of hash signatures. The method may include identifying, based on the set of web components, one or more web frameworks for the document. The method may include generating a graphical interface to display information about the one or more web frameworks identified for the document.

In some embodiments, the information displayed in the graphical 1 interface indicates a name of each web component in the set of web components and a version of the web component. The information may indicate a first date when the web component was first identified and a second date when the web component was most recently identified. The information may include a name and a version identifier of each of the one or more web frameworks.

In some embodiments, the one or more web frameworks includes a first web framework. The first web framework may be identified by including the set of web components. The information may include first information indicating a first name and a first version identifier of the first web framework. The information may include second information indicating the first name and a second version identifier of the first web framework. The first version identifier may be different than the second version identifier.

In some embodiments, the one or more web frameworks includes a first web framework and a second web framework. The method may include determining, from among the one or more web frameworks, a web framework having a best match for the document based on the plurality of objects in the document. The information in the graphical interface may indicate the web framework having the best match for the document. In some embodiments, the set of web components includes a first set of web components and a second set of web components. The first web framework may be identified by including the first set of web components. The second web framework may be identified by including the second set of web components. The first set of web components and the second set of web components may include a first web component. In some embodiments, the first web framework corresponds to a first version of a web framework and the second web framework corresponds to a second version of the web framework. Determining the web framework as having the best match for the document may include determining an intersection between the first set of web components and the second set of web components. The web framework may be a third web framework determined as having the best match based on the intersection. The third web framework may correspond to a third version of the web framework.

In some embodiments, a plurality of objects in a document includes a first object defined as JavaScript for a first web component, a second object defined as a cascading style sheet (CSS) for a second web component, and a third object defined as an image for a third web component.

In some embodiments, a hash function is a cryptographic hash function. The cryptographic hash function may be based on an MD5 hashing algorithm. The hash function may be a non-cryptographic hash function. The non-cryptographic hash function may be based on a number hashing algorithm.

In some embodiments, the method may include obtaining, from a repository system, files defining a web framework. Each of the files may correspond to a different web component in the plurality of web components. The method may include generating, using a hash function, a hash value for content in each of the files. The hash value is a hash signature for the file. The method may include storing, in association with information about the web framework, new files, each of the new files including the hash value generated for the content in a different one of the files.

In some embodiments, a document is obtained from the server computer using an uniform resource locator (URL). The document may be one of a plurality of documents of a website.

The foregoing, together with other features and embodiments will become more apparent upon referring to the following specification, claims, and accompanying drawings.

BRIEF DESCRIPTION OF THE DRAWINGS

Illustrative embodiments of the present disclosure are described in detail below with reference to the following drawing figures:

FIGS. 4-7 illustrate graphical interfaces for displaying information about one or more web frameworks and/or web components according to some embodiments.

DETAILED DESCRIPTION

Figure 1:
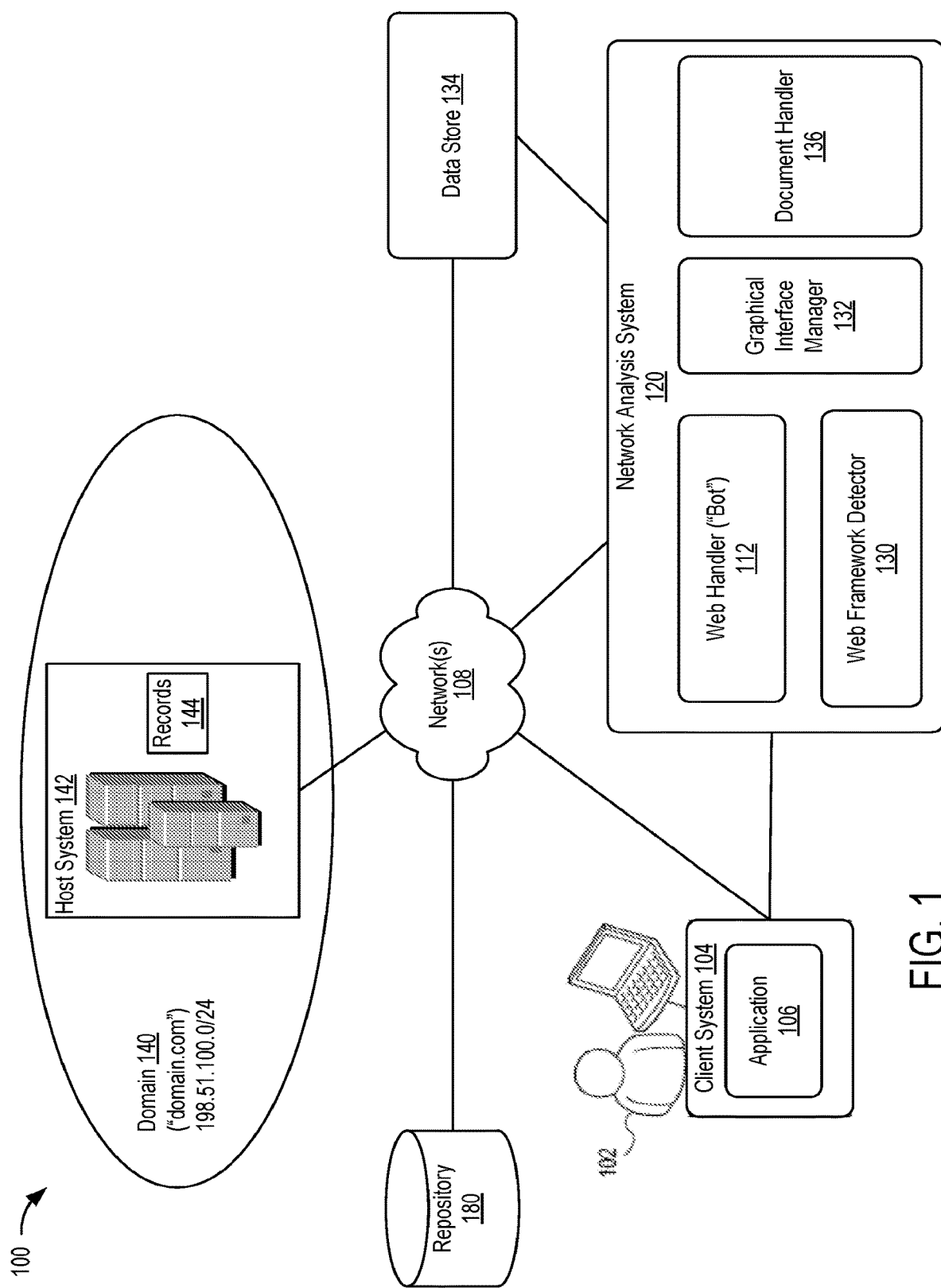
FIG. 1 shows a high-level block diagram illustrating a network analysis system according to an embodiment.

In the following description, for the purposes of explanation, specific details are set forth in order to provide a thorough understanding of embodiments of the present disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

Some embodiments, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in memory (e.g., on a memory device, on a non-transitory computer-readable storage medium). In some embodiments, the processes depicted in sequence diagrams and flowcharts herein can be implemented by any of the systems disclosed herein. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In an aspect of some embodiments, each process in the figures of this disclosure can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

I. High-Level View of Network Analysis System

FIG. 1 shows a high-level block diagram of a system 100 according to an embodiment of the present disclosure. One or more of the below-described techniques may be implemented in or involve one or more computer systems. The computing environment in FIG. 1 is not intended to suggest any limitation as to scope of use or functionality of described embodiments.

System 100 may include one or more client systems 104 (referred to herein as "client system" or "client") and network analysis system 120. Network analysis system 120 may be implemented by a computing system. Client system 104 may be operated by one or more users (e.g., user 102), such as a network analyst whose role it is to assess network activity.

Client system 104 may include an interface, such as a physical interface, a graphical interface (e.g., a graphical user interface), or a combination thereof. A graphical interface may be generated by client system 104, received from network analysis system 120, or a combination thereof. The graphical interface may be updated or modified by client system 104 or network analysis system 120 in response to interaction with the interface. The interface may be provided by network analysis system 120 via network 108 as part of a service (e.g., a cloud service) or application. In some embodiments, client system 104 may provide access to one or more applications 106 ("app"). App 106 may enable a user to access and perform services provided by network analysis system 120. In some embodiments, app 106 may enable a user, e.g., a network administrator or analyst to control and view web framework monitoring for documents. In particular, app 106 can enable a user to view web framework detection for one or more web documents for a website. The app 106 can provide information indicating the name and version of a web framework used for each page and statistical information generated that indicates a match for the page. Examples of interfaces are illustrated and described with reference to FIGS. 4-7.

Embodiments are directed to detecting web frameworks and/or web components of documents accurately and periodically. Detecting web frameworks and/or web components may be used to identify security vulnerabilities and assess operational performance of documents for websites. A document object model (DOM) may be used to identify objects in a document to determine fine-grain detection of web components. A hash signature of each object may be generated and compared to a hash signature of each of different web components defining one or more web frameworks. The comparison may be used to accurately determine web components of a document, and a web framework for the document based on those web components. Accordingly, embodiments are capable of identifying, in real-time, web frameworks implemented within a website, or documents generally defined by a model. Thus, embodiments provide a deeper understanding of documents, such as documents of a website. Accordingly, the deeper understanding of documents may enable a user to accurately assess functionality of a website. As such, embodiments provide a deeper understanding of website behavior by analyzing the full activity and functionality associated with a website, email, or other Internet-connected device rendering documents. The functionality may be used to identify security and performance issues with documents. The issues may be used to determine a change in conformity to a particular web component and/or web framework.

A document object model (DOM) is a platform-neutral and language-neutral interface that allows programs and scripts to dynamically access and update the content, structure and style of documents. The documents may include any data that can be exchanged and stored by computer environments. For example, a document may include received hypertext markup language (HTML) code or extended markup language (XML) for a webpage. Documents may be electronic documents that include data defining content. A document may include a web document (e.g., a web page), an email document, an attachment document, or any other document that may be defined by a DOM. A document as referred to herein may be referred to as a web document, which is accessible via a network. A document may be stored on a computer (e.g., server computer). The document may be accessible at a location, such as a location defined by a uniform resource locator (URL). The location may be used to retrieve or access the document.

A DOM object may be generated based on the DOM. The DOM object may define the logical structure of documents and the way a document is accessed and manipulated through a tree structure, called a DOM tree. The document can be further processed and the results of that processing can be incorporated back into the presented page to provide an updated DOM object. The DOM object allows applications dynamically access, interact, and update information received from one or more server computers providing documents, such as documents for a website. A DOM object may be used to identify node objects, or objects in a document. Some objects may be defined as a web component.

A web component may define an object in a document defined by a DOM. A web component may be a widget that is reusable for providing functionality or content to a document. A web component may specify a location or a source of content (e.g., code or data) in a document. Examples of web components may include, without limitation, JavaScript, cascading style sheets (CSSs), or images.

A web framework may be a programming framework supporting functionality for documents in applications including web applications (e.g., web services, web resources, and web application programming interfaces (APIs)). A web framework may define a common functionality for web documents. A web framework may be defined by one or more libraries and templates. A web framework may be hosted in a system by a provider of the web framework, or a repository system that provides access to the framework.

Client system 104 and network analysis system 120 may be communicatively connected via one or more communication networks 108. Examples of communication networks include, without restriction, the Internet, a wide area network (WAN), a local area network (LAN), an Ethernet network, a public or private network, a wired network, a wireless network, and the like, and combinations thereof.

Different communication protocols may be used to facilitate the communications including both wired and wireless protocols, such as IEEE 802.XX suite of protocols, TCP/IP, IPX, SAN, AppleTalk, Bluetooth®, and other protocols.

Network analysis system 120 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up network analysis system 120 may run any of a number of operating systems or a variety of additional server applications and/or mid-tier applications, such as HTTP servers, FTP servers, CGI servers, Java servers, database servers, and the like. Exemplary database servers include without limitation those commercially available from Microsoft, and the like. In one example, network analysis system 120 may include a RiskIQ™ product or service, which provides digital footprint management or monitoring of network activity with regard to network assets. In various embodiments, network analysis system 120 may be configured to run one or more services or software applications described in the foregoing disclosure. For example, network analysis system 120 may correspond to a computing system for performing processing as described herein according to an embodiment of the present disclosure.

In some embodiments, network analysis system 120 may be implemented as an enterprise computing system or a cloud computing system comprising one or more computers and/or servers that may include those described above. Network analysis system 120 may include several subsystems and/or modules, including some, which may not be shown. For example, network analysis system 120 may include web framework detector 130, web handler ("BOT") 112, document handler 136, and graphical interface manager 132. Network analysis system 120 may have more or fewer subsystems and/or modules than shown in the figure, may combine two or more subsystems and/or modules, or may have a different configuration or arrangement of subsystems and/or modules. Subsystems and modules of network analysis system 120 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, network analysis system 120 may also provide other services or software applications that can include non-virtual and virtual environments. In some embodiments, these services may be offered as web-based or cloud services or under a Software as a Service (SaaS) model to the users of client system 104. The services offered by network analysis system 120 may include application services. Application services may be provided by network analysis system 120 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in network analysis system 120, which may be implemented as a cloud infrastructure system. Users can acquire the application services without the need for customers to purchase separate licenses and support. Various different SaaS services may be provided. Users operating client system 104 may in turn utilize one or more applications to interact with network analysis system 120 to utilize the services provided by subsystems and/or modules of network analysis system 120.

Network analysis system 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in network analysis system 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

System 100 may also include or be coupled to one or more data sources, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, system 100 may be coupled to or may include one or more data sources or repositories such as repository system 180. The repository system 180 may be controlled by a third party. Examples of repository systems include, without limitation, GitHub® and Apache Subversion® (SVN). The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data sources may be accessible by network analysis system 120 using network 108.

System 100 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, system 100 may be coupled to or may include one or more data stores, such as data store 134. Data store 134 may be included in or accessible network analysis system 120. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data store 134 may be a network-accessible store accessible by network analysis system 120 using network 108.

Data store 134 can be used to store and manage information about web framework detection. The processes of storing disclosed herein may be implemented using data store 134. Data store 134 may be implemented as a database that can be queried. For example, data store 134 can be queried to identify hash signatures that match a hash signature of web component as described below. The name and the version of a web framework can be identified by association with the hash signatures stored for the web framework. The results of the processes disclosed herein may be stored in data store 134 that may be searchable, modifiable, and accessible by network analysis system 120. Client system 120 may access data stored in data store 134 using app 106.

System 100 may include one or more network domains (e.g., an Internet domain), such as domain 140. Domain 140 may provide one or more websites. Each domain may be implemented by a host system, which implements a domain name server (DNS) for the domain. The DNS may maintain a directory of domain names and translate, or resolve them to Internet Protocol (IP) addresses. Domain 140 may include a host computing system 142. Host computing system 142 may stores records 144 to implement a DNS for domain 140. Domain 140 may be mapped (e.g., via DNS) to one or more IP addresses.

System 100 may implement one or more techniques for web crawling. For example, network analysis system 120 may implement an web handler 112 (e.g., a "bot") to handle communications on the network 108. Web handler 112 may communicate with elements in system 100. Specifically, web handler 112 can send requests (also referred to herein as "dependent requests" and "web requests") for each web component identified in a document. Web handler 112 can receive responses (also referred to herein as "web responses" and "dependent responses") to requests. A request for a web component may be sent to a source specified by an object in a document defined by the web component. The response may be received from a source. The source may be the same as a source of a document that includes the web component. The source can be different from a source of the document. Web handler 112 can crawl the Internet, in particular websites, such as a website provided by host system 142. Web handler 112 may be implemented by or as a part of network analysis system 120, or may be initiated on network 108.

Web handler 112 may passively or actively crawl the Internet for websites. Web handler 112 may mimic operation of a web application (e.g., a web browser) to render webpages. For example, web handler 112 may cause web documents (e.g., web pages) of a website to be rendered. Web handler 112 may actively monitor websites by probing a host system 142 of a website for a configuration file or information about a website, including web frameworks that are used. However, such techniques may be obstructive and unreliable. Web handler 112 may implement passive techniques to assess a website for web framework. For example, web handler 112 may send requests (e.g., dependent requests) and receive responses (e.g., dependent responses) for accessing a web component. Such web requests may be dependent on a web framework for a web document. Web handler 112 may passively monitor web requests for web documents of a website. Web handler 112 may perform operations disclosed herein for monitoring web documents and web requests.

Document handler 136 may perform processing to obtain documents and identify objects in the document corresponding to web components. Document handler 136 may obtain one or more documents of a website for processing to identify a web framework and/or one or more web components of the document. Each document may be obtained from a server computer (e.g., a web server computer) hosting the document. Documents may include, without limitation, a web document (e.g., a web page), an email document, an attachment, or other electronic document that can be defined by a model (e.g., a DOM). The document may be accessible at a location, such as an uniform resource locator (URL). The document may be obtained based on the URL. The document may be one of a plurality of documents of a website. The website may be part of a domain provided by a host system.

Document handler 136 may implement a process called "site scan" whereby one or more documents of a website are processed to determine the web components that define a web framework for the document(s). Document handler 136 may implement a process called "inventory scan" whereby one or more documents of an entire website are processed to inventory the entire website including determining the web components that define a web framework for the document(s) of the entire website. Yet in some embodiments, one or more documents of a website to be analyzed may be sent from another computer system, such as a computer system managed by a user (e.g., a network analyst), associated with the website. Regardless of the process implemented to determine the document(s) to process, the document(s) may be obtained by initiating a call (e.g., a request) to a source (e.g., a web server computer) of the document. For example, a request may be sent to a web server computer to provide the document located at a URL. The web handler 112 may mimic operation of a computer loading a document of a website to request the document.

Document handler 136 may process a document to determine one or more objects in the document. Each document may be defined by a model, such as document object model (DOM). The document may be rendered, as if being loaded in a browser, using the DOM. A DOM object may be created based on rendering the document. A DOM may be used to render the document. In some embodiments, a DOM object may be generated based on rendering the DOM for the document. By rendering the document using the DOM, a plurality of objects may be determined in the document. The DOM object may provide access to objects (e.g., nodes or node objects) in the document defined by the DOM. Some or all of the objects may be defined by or implemented as a web component. Some objects may define a style and/or a function for presenting the document. Some objects may each correspond to a resource accessible at a location defined by the document (e.g., a link in the document). A plurality of objects may be determined in the document. Each of the plurality of objects may be defined as one of a plurality of web components. Objects may be defined as, without limitation, a JavaScript code, a cascading style sheet (CSS), or an image. Some or all of the web components defined in the document may be defined as part of a web framework.

Document handler 136 may process a document using techniques known by a person of ordinary skill in the art. Such techniques may include parsing the document to identify objects. In some embodiments, the document may be parsed using one or more programming interfaces supporting a format or standard of the document. For example, a document is defined by a model (e.g., a DOM), which is defined by an interface that provides functions to access information in the document, such as objects. The document may be rendered using the model. A DOM object may be generated, which can be used to identify objects in a document. Rendering the document using the model may enable the objects to be identified and/or accessed in the document. In some embodiments, each of the objects may be processed to determine whether the object is a generic object defined by a web component, or a specific (or non-generic) object specific to a website. Specific, or non-generic objects, which may be defined by a web component, may not be generic by being defined in a web framework. Examples of non-generic objects may include images and JavaScript that are defined by a source of the document, such as a web server that provides the objects.

Web framework detector 130 may perform operations disclosed herein as being performed by network analysis system 120. For example, web framework detector 130 may monitor and detect versions of web frameworks for web documents. The web documents may be those monitored by web handler 112. Web framework detector 130 may analyze the web responses to determine their hash signatures by generating a hash value using a hash function on the web responses. Web requests may have a format or structure that matches one or more web frameworks. As such, network analysis system 120 can compare the hash signature of each web response against hash signatures of files defining web components for a web framework.

As disclosed in further detail below, network analysis system 120 can access files defining one or more known web frameworks. The files can be accessed from repository 180. Network analysis system 120 can generate a hash signature for each file of a web framework by applying a hash function to the file. The hash signatures for the files of each of the different web frameworks can be compared to the hash signature of each web request for one or more web pages. Network analysis system 120 can identify a closest matching web framework by comparing the hash signatures of the web requests for one or more web documents to the hash signatures of each of the web frameworks.

Graphical interface manager 132 may perform operations disclosed herein for generating, displaying, and presenting a graphical interface. Examples of graphical interfaces and their functionality are described with reference to FIGS. 4-7.

II. Processes for Detecting a Web Framework

Figure 2:
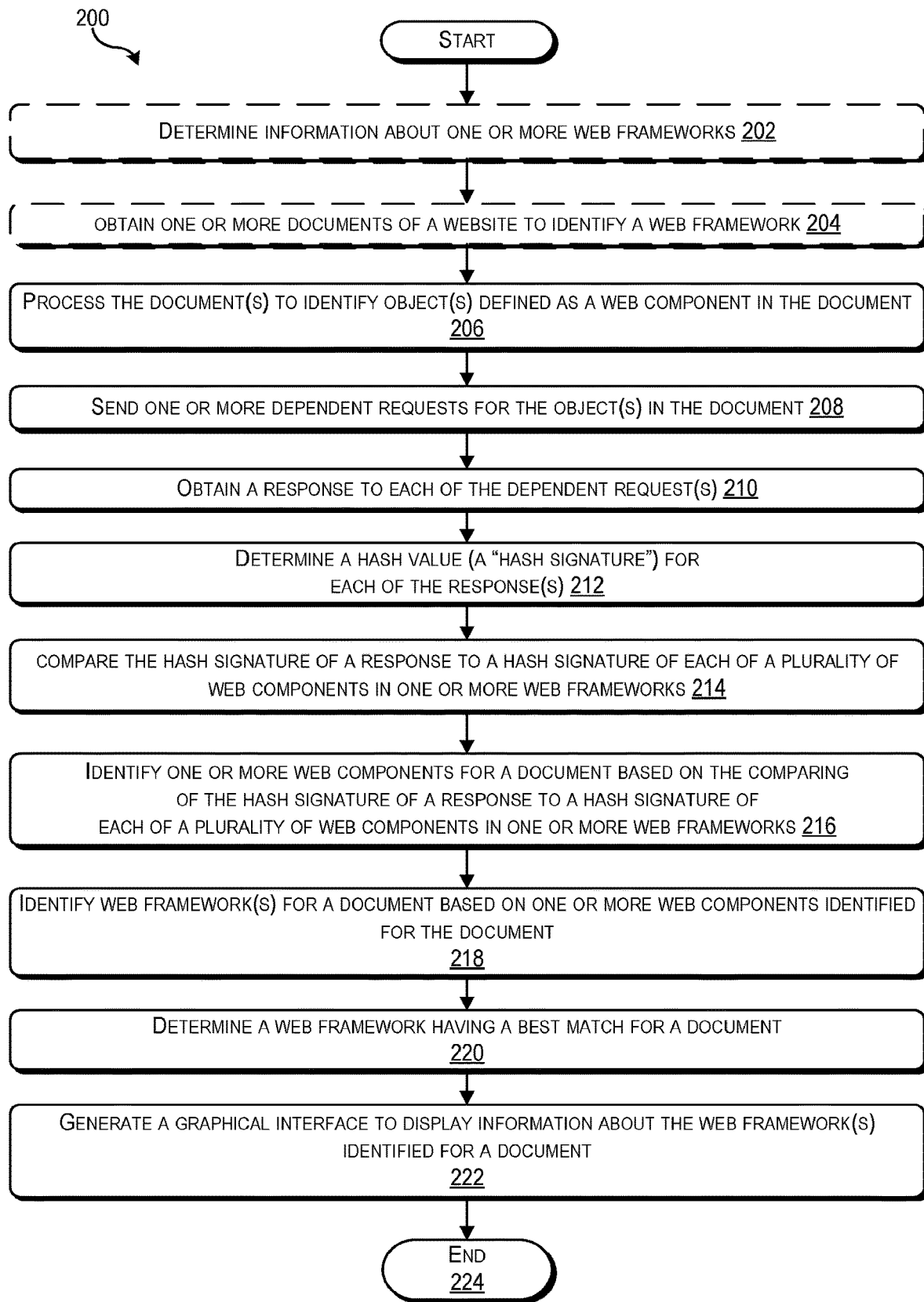
FIG. 2 illustrates a flowchart of a process of detecting a web framework according to some embodiments.
Figure 3:
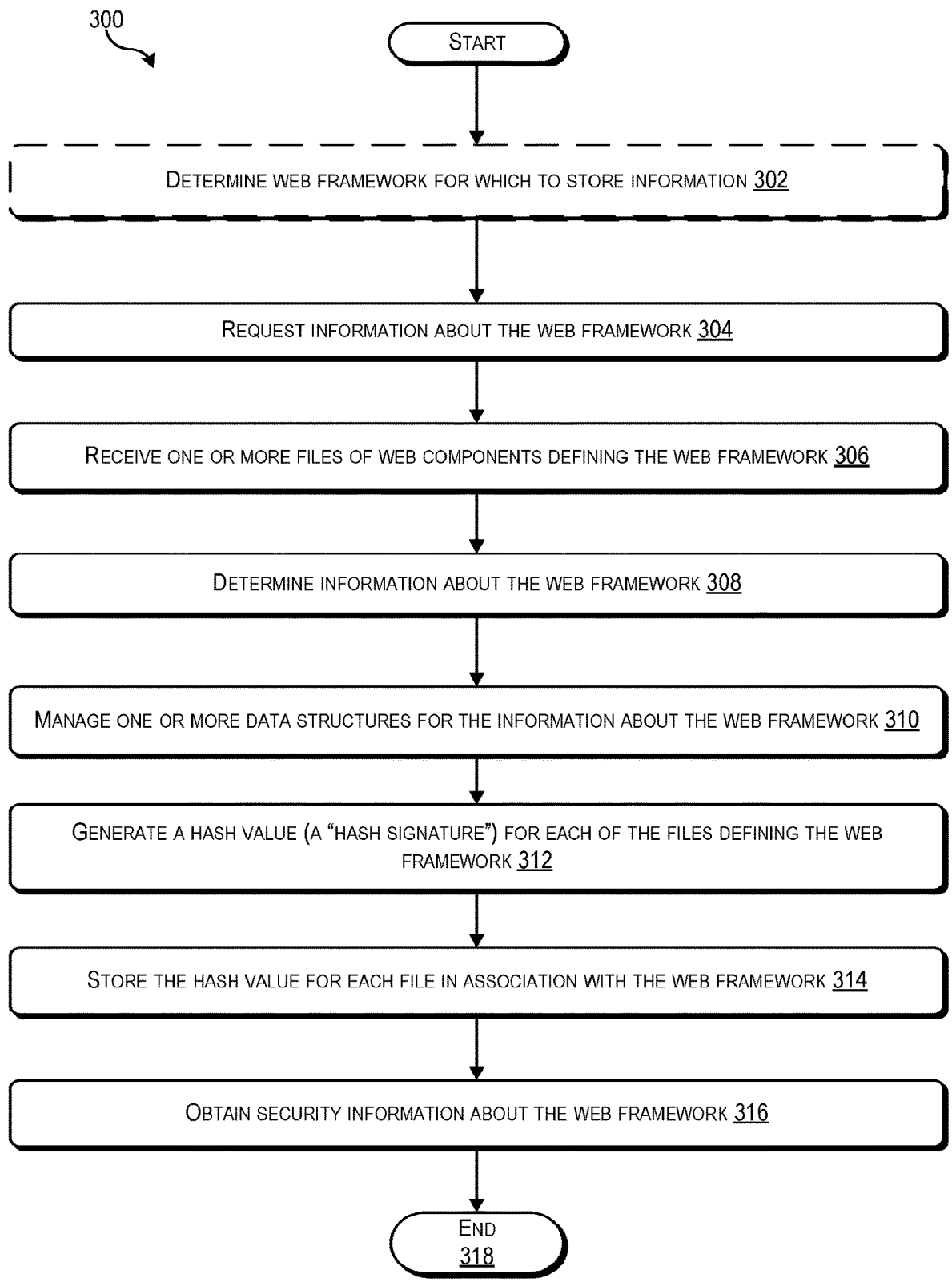
FIG. 3 illustrates a flowchart of a process for managing information about one or more web frameworks according to some embodiments.

FIGS. 2 and 3 provide flowcharts illustrating processes for detecting a web framework according to some embodiments of the present disclosure. Although the processes are described with respect to a web framework, the techniques disclosed herein may be applied for any type of framework (e.g., document framework), not limited to a web framework, and may be applied to determining one or more components in a framework. Variations or modifications may be made to adapt to detecting other types of frameworks. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted in FIGS. 2 and 3 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). For example, network analysis system 120 of FIG. 1 can implement the processes described with reference to any of FIGS. 2 and 3. Any of the processes may be implemented as a service to a user of network analysis system 120. One or more components of network analysis system 120 may implement the processes in the flowcharts disclosed herein.

The particular series of processing steps in FIGS. 2 and 3 is not intended to be limiting. Any step may correspond to one or more blocks of a process described with reference to a flowchart. Other sequences of steps may also be performed according to alternative embodiments. For example, alternative embodiments of the present disclosure may perform the steps outlined above in a different order. Moreover, the individual steps illustrated in FIGS. 2 and 3 may include multiple sub-steps that may be performed in various sequences as appropriate to the individual step. Furthermore, additional steps may be added or removed depending on the particular applications. While processing depicted in FIGS. 2 and 3 is with respect to detecting a web framework for a single document, such processing may be implemented for several documents and/or a website implementing any number or a combination of web frameworks. One of ordinary skill in the art would recognize many variations, modifications, and alternatives.

The process depicted in FIGS. 2 and 3 enable at least a closest approximation, if not detection, of a web framework for one or more documents of a web site, or an entire website. A web framework may provide a framework for a content management system. Examples of different web frameworks may include, without limitation, content management system frameworks (e.g., WordPress®, Drupal®, Joomla®, Magento®, or Concrete5®). The processes described herein can determine a version of the web framework based on one or more web components. Identifying the name and the version of a web framework becomes even more important as security vulnerabilities are identified as being associated with a particular web framework. As such, an enterprise having enabling access to thousands of web pages, which are updated regularly, may desire to identify the different web frameworks in use for the web pages given potential security concerns. The security concerns may change with changes in malicious network activity. The processes described herein enable an enterprise to routinely and consistently identify a web framework in a non-obtrusive manner. Upon identifying a name and a version of a web framework, the version of the web framework may be modified for web pages having a particular vulnerability or limitation.

FIG. 2 illustrates a flowchart 200 of a process for detecting a web framework for one or more documents (e.g., a web document). The documents may define a website. Flowchart 200 may include and/or may optionally begin at block 202 by determining information about one or more web frameworks, and one or more web components associated with the web framework(s). One or more of steps described with reference to FIG. 3 may be implemented before or concurrently with the process of flowchart 200. The information about one or more web frameworks may be determined in any order with respect to the blocks in flowchart 200. In some embodiments, the information may be determined before block 214, where the information may be used to compare hash signatures.

Information about web frameworks and web components may be stored in a data store. Such information may be determined using techniques disclosed with reference to the processes of FIG. 3. The information about a web framework may include the name of the web framework, a version of the web framework, other information about a web framework, or combinations thereof. The information about a web component may include the name of the web component, a version of the web component, other information about a web component, or combinations thereof.

The information about web frameworks and web components may be accessed from a repository. Each of the files may include information defining a feature of the web framework, a web component, and/or one or more web components that define a web framework. The information may include a structure, a format, or an interface for requesting the feature of the web framework. The data store may include a unique value representing the data (e.g., resource information and/or source code) about each web component. The data may be that which would be returned in response to a request for the web component as an object defined in a document. The unique value (e.g., a hash signature) may be generated based on one or more hash functions applied to the data for a web component. For example, each of the files may be processed to determine a hash signature (e.g., a hash value) for the content in the file. The hash signature of each of the files for the web components defining each web framework may be stored in association with information (e.g., a name and a version) of the web framework. As described further below, the hash signature of each file can be compared with a response to a dependent request for a document to determine whether the web component matches the web component defined in the file.

Flowchart 200 may include obtaining a document (e.g., a web document) of a website at block 204. Flowchart 200 may optionally begin at block 204. One or more documents of a website may be obtained for processing to identify a web framework and/or one or more web components of the document. Each document may be obtained from a server computer (e.g., a web server computer) hosting the document. Documents may include, without limitation, a web document (e.g., a web page), an email document, an attachment, or other electronic document that can be defined by a model (e.g., a DOM). The document may be accessible at a location, such as an uniform resource locator (URL). The document may be obtained based on the URL. The document may be one of a plurality of documents of a website. The website may be part of a domain provided by a host system. Block 204 may be implemented for multiple instances depending on the number of documents to obtain.

In some embodiments, a network analysis system (e.g., network analysis system 120 of FIG. 1) may provide one or more GUIs to receive input from a user for specifying a website, or one or more URLs of documents to processes. In some embodiments, the network analysis system can automatically process one or more documents. For example, the network analysis system may implement a process called "site scan" whereby the network analysis system may process one or more documents of a website to determine the web components that define a web framework for the document(s). In another example, the network analysis system may implement a process called "inventory scan" whereby the network analysis system may process one or more documents of an entire website to inventory the entire website including determining the web components that define a web framework for the document(s) of the entire website. Yet in some embodiments, one or more documents of a website to be analyzed may be sent from another computer system, such as a computer system managed by a user (e.g., a network analyst), associated with the website. Regardless of the process implemented to determine the document(s) to process, the document(s) may be obtained by initiating a call (e.g., a request) to a source (e.g., a web server computer) of the document. For example, a request may be sent to a web server computer to provide the document located at a URL. The web handler 112 may mimic operation of a computer loading a document of a website to request the document.

At block 206, each of the document(s) is processed to determine one or more objects in the document. Flowchart 200 may begin at block 206. Block 206 may be implemented for multiple instances to determine the objects(s). Each document may be defined by a model, such as document object model (DOM). The document may be rendered, as if being loaded in a browser, using the DOM. A DOM object may be created based on rendering the document. A DOM may be used to render the document. In some embodiments, a DOM object may be generated based on rendering the DOM for the document. By rendering the document using the DOM, a plurality of objects may be determined in the document. The DOM object may provide access to objects (e.g., nodes or node objects) in the document defined by the DOM. Some or all of the objects may be defined by or implemented as a web component. Some objects may define a style and/or a function for presenting the document. Some objects may each correspond to a resource accessible at a location defined by the document (e.g., a link in the document). A plurality of objects may be determined in the document. Each of the plurality of objects may be defined as one of a plurality of web components. Objects may be defined as, without limitation, a JavaScript code, a cascading style sheet (CSS), and an image. Some or all of the web components defined in the document may be defined as part of a web framework. In at least one embodiment, objects may include a first object defined as JavaScript for a first web component, a second object defined as a cascading style sheet (CSS) for a second web component, and a third object defined as an image for a third web component.

The document may be processed by using techniques known by a person of ordinary skill in the art. Such techniques may include parsing the document to identify objects. In some embodiments, the document may be parsed using one or more programming interfaces supporting a format or standard of the document. For example, a document is defined by a model (e.g., a DOM), which is defined by an interface that provides functions to access information in the document, such as objects. The document may be rendered using the model. A DOM object may be generated, which can be used to identify objects in a document. Rendering the document using the model may enable the objects to be identified and/or accessed in the document. In some embodiments, each of the objects may be processed to determine whether the object is a generic object defined by a web component, or a specific (or non-generic) object specific to a website. Specific, or non-generic objects, which may be defined by a web component, may not be generic by being defined in a web framework. Examples of non-generic objects may include images and JavaScript that are defined by a source of the document, such as a web server that provides the objects.

At block 208, one or more requests (also referred to as dependent requests) are sent for each of the objects determined in a document. For example, requests for the plurality of objects may be sent to a source of each of the objects. In some embodiments, each object may specify a source. Each of the requests may correspond to a different object in the plurality of objects. Each request may be for a web component defining a different object in the plurality of objects.

Block 208 may be implemented for multiple instances to send a request. Requests may be sent concurrently or sequentially. A request may be sent to a computer system (e.g., a web server computer) that is a source of a document, or a location indicated for the object. A dependent request may include, without limitation, a request on JavaScript (e.g., a JavaScript request), a request for a cascading style sheet (CSS) (e.g., a CSS request), and an image request. A request may be defined based on or according to a web framework. A request may be defined such that it has a format or a structure according to a web framework for requesting the object. Sending the request may mimic the behavior of an application (e.g., a web browser) that processes and renders the document. For example, web handler may requests each object that would be issued to render the web document.

At block 210, a response to each request is obtained. Responses may be obtained in order received, or according to some other (e.g., an order in which requests are sent). Each response may correspond to a different request of the requests sent at block 208. Each response may include data for the web component defining the object for a request. The data may include program code or data defined for an object by a web component. The response may be obtained by mimicking the behavior of an application that processes and renders the document. In some embodiments, the responses may be captured using passive capture techniques for capturing responses to requests. Each response may be stored in association with a dependent request so as to map the object to a response. Each of the responses may contain data about an object for which a request is sent. The data may define a web component.

At block 212, a hash value (a "hash signature") is determined for each of the responses obtained for a web request. In some embodiments, a plurality of hash values may be generated. Each of the hash values may be generated for a different response obtained at block 210. The hash value of a response may be determined by executing a hash function to the data in the response. The hash function may implement one or more hashing algorithms. In some embodiments, the hashing algorithm can be a known hashing algorithm such as a cryptographic hashing algorithm (e.g., MD5) or a non-cryptographic hashing algorithm (e.g., number hash). The hash signature generated for response to a web request may represent a unique value for the data in a response to the web request. As such, a web request having a format or a structure defined by a web framework may have a hash signature that matches a file defining a structure of the request for the web framework. Block 212 may be implemented for multiple instances, each to determine a hash value for a unique response obtained for a web request.

At block 214, the hash signature for each of the response(s) is compared to each of the hash signature for each of the web components stored in a data store. The hash signatures for the web components may be generated at block 202 or during the process described with reference to FIG. 3. Each of the hash values generated at block 212 may be compared to a plurality of hash signatures. Each of the plurality of hash signatures may be generated by applying the hash function (e.g., the same as the hash function applied at block 212) to a different web component of a plurality of web components. The plurality of web components may include all or some possible web components in the web frameworks that may be used for comparison.

A hash signature for each web component may be stored in a distinct file. Block 214 may be implemented for multiple instances, each corresponding to a different response. The hash signature of a response may be compared to the file including the hash signature of a web component stored in the data store. In some embodiments, files defining a web framework may be obtained from a repository system. Each of the files may correspond to a different web component in a plurality of web components used for one or more web frameworks. The hash signature may be generated for content in each of the files. A new file may be generated for each file in which a hash signature is generated. The new files may be stored in association with information about the web framework to which the files define.

The hash signature of a response may be compared to the hash signatures generated for web components to determine a measure of similarity if not an exact match. Because the web components being compared may be generic, the hash signature of a response may match a hash signature of a web component. In some embodiments, one or more hash signatures may be identified as matching the hash signatures for response. The hash signatures, if not matching exactly, may be compared to determine how similar according to a similarity threshold. The similarity threshold may be defined based on one or more attributes of a web component. Block 214 may be implemented for multiple instances, each corresponding to a different response until a match, or one or more best matches, is identified for each response.

At block 216, one or more web components of one or more web frameworks may be identified for each response for which a hash value is compared at block 214. In some embodiments, for a document, a set of web components may be identified for the document from a plurality of web components defining one or more web frameworks. Each web component in the set of web components may be identified by having a different hash signature that matches a different one of the hash values using the comparing at block 214. The different hash signature is one of the plurality of hash signatures for the plurality of web components.

Collectively, the web components may be identified for an entire document based on the web components identified for each response obtained for that document. The hash signature of a response may be compared to a hash signature of each web component of a plurality of web components to identify one or more web components having a hash signature that matches the hash signature. The hash signature for each of a plurality of web components may be determined as disclosed herein. The hash signature for each response may be compared if and until a hash signature of a web component is matched, or identified as a best match. Block 216 may be implemented for multiple instances, each corresponding to a different response until a match, or best match, is identified for each response. A web component may be identified for a response if the hash signature of the response matches the hash signature of the web component, exactly, or matches based on satisfying a similarity threshold. Identifying a web component may include obtaining information about the web component stored in association with the hash signature for the web component.

At block 218, one or more web frameworks may be identified for a document based on the one or more web components identified for each response obtained for the document. For example, one or more web frameworks may be identified for a document based on the set of web components identified at block 216. Block 218 may be implemented for each document obtained at block 204. The one or more web components are those identified at block 216 for the responses obtained for a document. Web frameworks can be identified by searching the information determined for one or more web frameworks based on the one or more web components identified for a document. For a web document, multiple web frameworks may be identified on the basis of web frameworks having all some of the web components identified for a document. In one example, the web frameworks may be different versions of a web framework. In another example, the web frameworks may be different web frameworks, each having its own version. The information about each web component may be stored in association with the hash signature for that web component. The information about each web component may be associated with one or more web frameworks that include the web component.

Based on the web components identified for a document, one or more web frameworks can be identified as associated with each of the web components using the information stored for each web component. For example, a web framework may be identified by including a set of web components identified at block 216. In some embodiments, a set of web components identified at block 216 includes a first set of web components and a second set of web components. The one or more web frameworks may include a first web framework and a second web framework. The first web framework may be identified by including the first set of web components. The second web framework may be identified by including the second set of web components. In some embodiments, the first set of web components and the second set of web components share one or more web components, such as a first web component.

The information stored about each web component indicates an association with one or more web frameworks. Each unique web framework can be identified by processing the association between each web component and a web framework to determine all or many of the web components included in the web framework. Processing may include generating data about each web framework associated with a web component, and the web frameworks that include one or more of the web components identified for a document. Each web framework may be identified for a document having all or some of the web components identified for a document. Processing may include generating data that indicates a relationship between each web component of a document and a web framework that has been identified.

In some embodiments, a web framework can be identified by comparing the hash signature of each web component identified in a document to the hash signatures in the files of each of the different web frameworks. A web framework can be identified as having files with hash signatures that match all of the hash signatures of the web components detected in the document. A web framework may be identified based on having a threshold number of files that match the web components.

At block 220, a web framework is identified as having a best match for a document based on web components identified for the document. Processing may include determining a web framework having a best match from a plurality of web frameworks, if multiple are identified at block 218. In some embodiments, the one or more web frameworks identified at block 218 may include a first web framework and a second web framework. A web framework having a best match for a document based on a plurality of objects identified in the document may be determined from among the one or more web frameworks. In some embodiments, the first web framework corresponds to a first version of a web framework and the second web framework corresponds to a second version of the web framework. Determining the web framework as having the best match for the document includes determining an intersection between a first set of web components defining the first version and a second set of web components defining the second version. The web framework (e.g., a third web framework) may be identified as having the best match based on the intersection. The third web framework corresponds to a third version of the web framework.

Any number of techniques may be implemented to deduce the web framework of the web page based on the identified web frameworks. A web framework may be identified as having a best matching for a document based on that web framework, compared to other web frameworks, having the greatest number of matching web components for the document. In some embodiments, a threshold may be defined for determining the best matching web framework. A web framework may be identified as the closest match by satisfying the threshold. The threshold may be defined based on one or more attributes of a web framework, such as types of web components, a number of web components, other attributes based on web components, or combinations thereof. A web framework may be identified as having a best match for including web components of a document based on satisfying the threshold.

In some embodiments, the web components identified for a document may be grouped for each of the multiple web frameworks identified at block 218. The web components may be organized into sets of web components (based on information about the web components) for each of the web frameworks based on information (e.g., a name and a version) of the web framework with which each of those web components is associated. In some embodiments, the files (each of which includes a hash signature) may be organized into the sets for the web components instead of the information about those web components. A set for web components may be created based on the files including the hash signature for each of the web components. The files may be easier to compared to each other when comparing multiple sets with each other. A set may be defined for one or more web components. Based on the sets created for each of the different web frameworks, a deduction is made as to the web framework having the set of web components with the best match. In some embodiments, the set for a web framework may be chosen as the best match based on having the most or a threshold number of web components having hash signatures that match hash signatures of responses for the document. The set of web components for any identified web framework having an insufficient statistical significance (e.g., statistical threshold) may be ignored, or not considered. For example, two or more sets of web components (each for a different web framework) may be compared to determine that one set does not have a statistical significance.

In some embodiments, processing may be performed to identify a version of a web framework having a best match when some or all of the web frameworks identified at block 218 include multiple versions of a web framework. Similar to the process described above, a set of web components may be identified for each of the multiple versions of a web framework. The sets may be compared to find the group for the version having the best match. The best match may be determined based on the set for the version of web frameworks having the most web components. In some instances, some web components may overlap, or otherwise be included in multiple sets, each set corresponding to a different version of a web framework. In such a case, the closest set, or best matching version of the web framework may be determined based on the intersection of the sets for the different versions of the web framework. Upon determining an intersection set of all the sets containing web components for more than one version of a web framework, then precision of the version of the web framework can be reduced until the versions in intersection set agree. The precision of the version of the framework can be reduced by a versioning technique known by a person of ordinary skill in the art. In at least one embodiment, a versioning technique may include determining patch version to minor version, followed by minor version to major version. For example, when multiple versions of a web framework, such as Drupal, are identified as 7.54 and 8.1.2, the versioning technique may include determining that a version in between the two versions is the best match. In some embodiments, web frameworks that are identified have a least matching, or having insufficient statistical significance can be discarded.

In one example, web frameworks identified for a document at block 218 may include a first web framework and a second web framework. A set of web components are identified for the first web framework, and a set of web components are identified for the second web framework. Determining one of the identified web frameworks having a best match for the document may include comparing a set of files corresponding to the first set of web components to a set of files corresponding to the second set of web components to determine the best match. Comparing the first set of files to the second set of files may include determining a set of files having a greatest number of files. In some embodiments, the first web framework corresponds to a first version of a web framework and the second web framework corresponds to a second version of the web framework. In such embodiments, comparing the first set of files to the second set of files may include determining a set of files that is an intersection of the first set of files to the second set of files. The one of the identified web frameworks having the best match is determined based on the intersection.

In some embodiments, a statistical measure (e.g., a value) may be computed to indicate a measure of a match of any web framework identified for a document. The measure may be computed based on the measure of web components that match responses for the document. The statistical value may be useful to display with the information about the web framework to enable a user or system (e.g., network analysis system) to determine the best matching web framework for the web document(s).

At block 222, a graphical interface is generated to display information about the web frameworks identified for a document, such as the web framework having the best match for a document. Information displayed may include the name of the web framework and a version of the web framework. In some embodiments, the information in the graphical interface indicates the web framework having the best match for the document. In some embodiments, the information may indicate a name of each web component in the set of web components identified at block 216 and a version of the web component. In some embodiments, the information indicates a first date when a web component was first identified (e.g., first seen) and a second date when the web component was most recently (e.g., last seen) identified.

In some embodiments, the one or more web frameworks identified include a first web framework. The web framework may be identified as having multiple versions. The information displayed in the graphical interface may include first information indicating a first name and a first version identifier of the first web framework. The information displayed in the graphical interface may include second information indicating the first name and a second version identifier of the first web framework. The first version identifier is different than the second version identifier.

The processes described with reference to FIG. 2 may be automated and/or may be performed according to a schedule. The information about the web framework may include information indicating a time and/or date when the web framework is identified. Period analysis of a document may enable information to be displayed about when the web framework is first seen, last seen, and/or when it has changed. Information about web frameworks may be displayed according to techniques disclosed herein, such as the interfaces described with reference to FIGS. 4-7.

The information to display about a web framework may be retrieved from a data store of information described with reference to FIG. 3. The information may include statistical information about a frequency and/or occurrence of a web framework and/or web components that are detected. In some embodiments, the information described with reference to FIG. 3 may be updated based on the processes implemented for flowchart 200. For example, the information may be updated to indicate statistics about a web framework that is detected, such as an occurrence, a frequency, and/or web components that are detected as being defined for a document for the detection of the web framework.

Blocks for flowchart 200 may be repeated for each document (e.g., web page) that is identified to be processed for determining a web framework. The techniques described with reference to flowchart 200 may be applied for the multiple web frameworks identified by processing multiple documents. A stronger match to a web framework can be identified by processing more web documents using the techniques described with reference to FIGS. 2 and 3.

In some embodiments, it may be desirable to identify the web framework having the best match for a website based on analysis of multiple web documents. Analyzing multiple web documents may enable a more accurate assessment of the web framework based on the web requests for those web documents.

Flowchart 200 may end at 224.

In FIG. 3, a flowchart 300 is illustrated of a process for determining information about one or more web frameworks and/or one or more web components according to some embodiments. One or more data stores (e.g., data store 134) may be created and managed for storing information about web frameworks and web components. The data store(s) may be updated according to a schedule. In some embodiments, the data store(s) may be updated with information based on receiving notification about an addition to or a change (e.g., including a change in a version) in a web component and/or a web framework. Information about web components and web frameworks may be obtained from a third party system.

The process described with reference to FIG. 3 may include managing (e.g., create, read, update, and delete) one or more data structures. The data structures may be implemented in storage, such as one or more data stores. A data structure may be implemented as one or a combination of different types of data structures including, without restriction, an array, a record, a relational database table, a hash table, a linked list, or other types of data structures. Each data structure may be described with reference to a particular number of fields and/or attributes. However, each data structure may be defined by more or fewer fields and/or attributes in a different arrangement than described.

Flowchart 300 may be implemented to begin in a variety of sequences. Flowchart 300 is described with reference to at least one embodiment which is web framework centric. In such an embodiment, information about web frameworks is obtained for flowchart 300 with respect to a single web framework. In such an embodiment, flowchart 300 may be implemented to determine information for each unique web framework. Flowchart 300 may be implemented for multiple instances, each to obtain information about a different or the same web framework. In some embodiments, information about web components may be determined before information about web frameworks is determined. In some embodiments, flowchart 300 may be implemented before flowchart 200 is implemented. All or part of flowchart 300 may be implemented concurrently with flowchart 200. In some embodiments, all or part of the process described with reference to flowchart 300 may be implemented as part of the process described with reference to flowchart 200 of FIG. 2. For example, flowchart 300 may be implemented as all or part of block 202 of FIG. 2. All or some portions of flowchart 300 may be implemented periodically based on a schedule and/or based on receiving a notification from a third party system about an addition or a change in a web framework. In some embodiments, flowchart 300 may be driven based on interaction with one or more GUIs configured to receive information to store and manage information about web frameworks.

In at least one embodiment, flowchart 300 may optionally begin at block 302 by determining a web framework about which information is to be determined. A web framework may be one for which information was previously determined such that flowchart 300 is performed to update the information and/or determine whether any updates exists. A web framework may be specified by an owner of a document, such as in information provided by or accessible from a website hosting the document. In some embodiment, a web framework may be specified via input to a graphical interface. A web framework may be one of several that are commonly used for documents on web sites.

At block 304, flowchart 300 may begin by requesting information about a web framework. The information may be requested from a repository system (e.g., repository system 180). Examples of repository systems include, without limitation, GitHub and Apache Subversion (SVN). The repository system may be managed by a source of the web framework or a third party that provides access to the web framework. The repository system may provide an interface to request files defining a web framework. In one example, a request may be sent to the repository system that provides the files for the web framework.

Although a web framework is described with references to files, the content of the files for a web framework may be obtained in a variety of formats, not just a file. In one example, the files for a web framework may be downloaded from a website provided by a provider of the web framework. In another example, the files for a web framework may be accessed (e.g., checked-out) from a version control system of the repository system. At block 306, information about a web framework may be received. For example, one or more files defining a web framework may be received through a download process from the repository system.

Each of the files for a web framework may include information defining a feature or web component of the web framework. The information may include a structure, a format, or an interface for requesting the feature of the web framework, such as a web component. Each file may correspond to one or more web components that define or are included in a web framework. All or some of the web components may be required for the web framework. Each file may correspond to a unique web component. In some embodiments, a web framework may include multiple versions of a web component. A web component may be common to multiple, different web frameworks. The files for a web framework may be obtained by the repository system from a provider of the web framework.

At block 308, information (e.g., a name and a version) is determined for each of the web frameworks for which files are obtained. Each web framework having a different name may correspond to a type of web framework. The type of framework may vary. For example, web frameworks may include, without limitation, frameworks for content management systems (e.g., WordPress®, Drupal®, Joomla®, or Concrete5®). The information about a web framework can be determined based on information in the files that are obtained. In some embodiments, the files may be obtained at step 302 with information about the web framework. The information about a web framework may be obtained from the repository system from which the files were obtained.

At block 310, one or more data structures are managed for the information about a web framework. One or more data structures may be created for managing information about a web framework including an association with the data corresponding to each file for the web framework. If the data structure(s) exist for a web framework, then those data structure(s) can be updated to reflect changes. In some embodiments, a data structure may be maintained to identify the differences between files of different versions of web frameworks. The data structure may be used to determine a best matching version of the web framework. To identify a web framework for a document based on hash signatures of web components in the document, the hash signatures of the web components may be compared to the files of hash signatures (disclosed herein) in each of the web frameworks to determine a web framework for the document based on the files that match.

At block 312, a hash value (a "hash signature") may be generated for the content in each of the files obtained for each of the web frameworks. The hash value may be generated by a hash function that implements a hashing algorithm. In some embodiments, the hashing algorithm can be a known hashing algorithm such as a cryptographic hashing algorithm (e.g., MD5) or a non-cryptographic hashing algorithm (e.g., number hash). The hash function may generate the hash value for a file, such that the hash value represents all of the content in a file as a unique value. In some instances a file for a web component may be named differently across different versions, but the content may be the same. In such an instance, the same hash signature may be generated for each file, although the files correspond to different versions of a web component. Where the content changes, each file may have its own hash signature.

In some embodiments, one or more data structures may be maintained for information about web components. Flowchart 300 may include identifying each unique web component in one or more web frameworks to manage a data structure of all unique web components. The web component information about each of the files for a web framework may be used to identify each unique web component. The data structure may include a name, a version, a web component type of each web component, and a hash signature (e.g., a file) generated (as discussed below) for the web component. The data structure may include information indicating a relationship or association with one or more web frameworks. The information about a web component may be another way to identify the web frameworks that include a web component identified in a document. The relationship or association may be used to identify each web framework for each identified web component.

At block 314, the hash value generated for each of the files of a web framework are stored in association with the information for the web framework. The hash values for files may be stored in a data store in association with the information.

At block 316, security information about the web framework may be obtained. Security information may include information that can be used to assess a strength or level of security for a web framework and/or web components. The security information may be obtained by communication with one or more third party sources. Examples of third party sources may include, without limitation, a source of common vulnerabilities and exposures (CVE). Security information may include information indicating a measure of security (e.g., a score or a value) about vulnerabilities for the web framework or web components. The security information may indicate whether the version of a web framework and/or a web component is deprecated. The security information can be displayed with the information about a web framework and/or web components.

Flowchart 300 ends at block 318.

III. Graphical Interfaces for Web Framework Detection

FIGS. 4-7 illustrate examples of graphical interfaces in accordance with some embodiments. The graphical interfaces illustrates various examples for enabling detection of web frameworks. Specifically, the graphical interfaces display information about web frameworks and/or web components that are identified in a document. Each graphical interface may be generated and managed by graphical interface manager 132 of FIG. 1. A graphical interface may be modified to display additional information or one or more additional graphical interfaces such as those described with reference to the following figures. Although some embodiments are described with a graphical interface including one or more graphical interfaces, any number and combination of graphical interfaces may be provided according to techniques disclosed herein. An example of a graphical interface is a graphical user interface (GUI). Instead of a graphical interface included in another graphical interface, one or more interactive elements may be implemented in the graphical interface to enable the same functionality. In response to interaction with a graphical interface as disclosed herein, a network analysis system can perform processing to produce the information for an updated or new graphical interface and can produce the updated/new graphical interface. The processes described with reference to FIGS. 2 and 3 may be implemented through interaction with a graphical interface. The graphical interface(s) disclosed herein may be accessible (e.g., rendered) at a client system (e.g., client system 104 of FIG. 1).

In this disclosure, "an element" may be included in an interface. An element may be displayable and/or part of an interface. Examples of elements include, without limitation, a control, a button, a navigation bar, or other visible component that can be part of an interface that can be perceived by sound, vision, touch, or combinations thereof. An element can receive input. For example, an interactive element may be an element that is interactive to receive input. An interactive element may receive input to enable interaction with the graphical interface. In some embodiments, the graphical interfaces disclosed herein can be displayed with or in response to interaction with a graphical interface of an application or a website. For example, the graphical interfaces disclosed herein may be displayed with applications and services, such as without limitation, RiskIQ Digital Footprint™ and RiskIQ PassiveTotal™.

Now turning to FIG. 4, a graphical interface 400 is shown displaying information about web components identified in a document. Graphical interface 400 may include an interactive element 402 that is interactive to select to view components identified in a document. The components may be identified by network analysis system 120 for processing the document multiple times. Graphical interface 400 may include a graphical interface 404 that is interactive to view information about each component identified in a document. In at least one embodiment, interface 404 may be displayed as a table, where each row corresponds to a data record for a distinct web component identified in a document. One or more actions may be performed on the rows, such as filtering and sorting with respect to each attribute of the data record. In some embodiments, graphical interface 400 may include a graphical interface 406 that is interactive to filter the data records based on one or more attributes of the data records. Graphical interface 400 may include an element that enables a user to download the data records shown in interface 404.

Each row may display information about an attribute of a web component identified in a document. Examples of attributes may include, without limitation, a hostname of a host of a web component, dates when the web component was detected ("seen"), a category or type of web component, a value defining the web component (e.g., a provider of the web component), one or more web frameworks, and one or more tags (e.g., personal tags) associated with the web component. Graphical interface 400 may be interactive to receive input to customize or configure one or more tags to be associated with a web component. In some embodiments, one or more rows or attributes in a row may be presented in a manner (e.g., using audio, graphics, or video) so as to highlight vulnerabilities or issues related to web frameworks and/or web components. The presentation may be updated as changes, additions, or modifications are detected in real-time. Techniques disclosed with reference to FIGS. 2 and 3 may be used to identify one or more web frameworks that include each of the web components. The information about the web framework may be displayed to enable a user to assess security vulnerabilities of web components and web frameworks used for a document.

Figure 5:
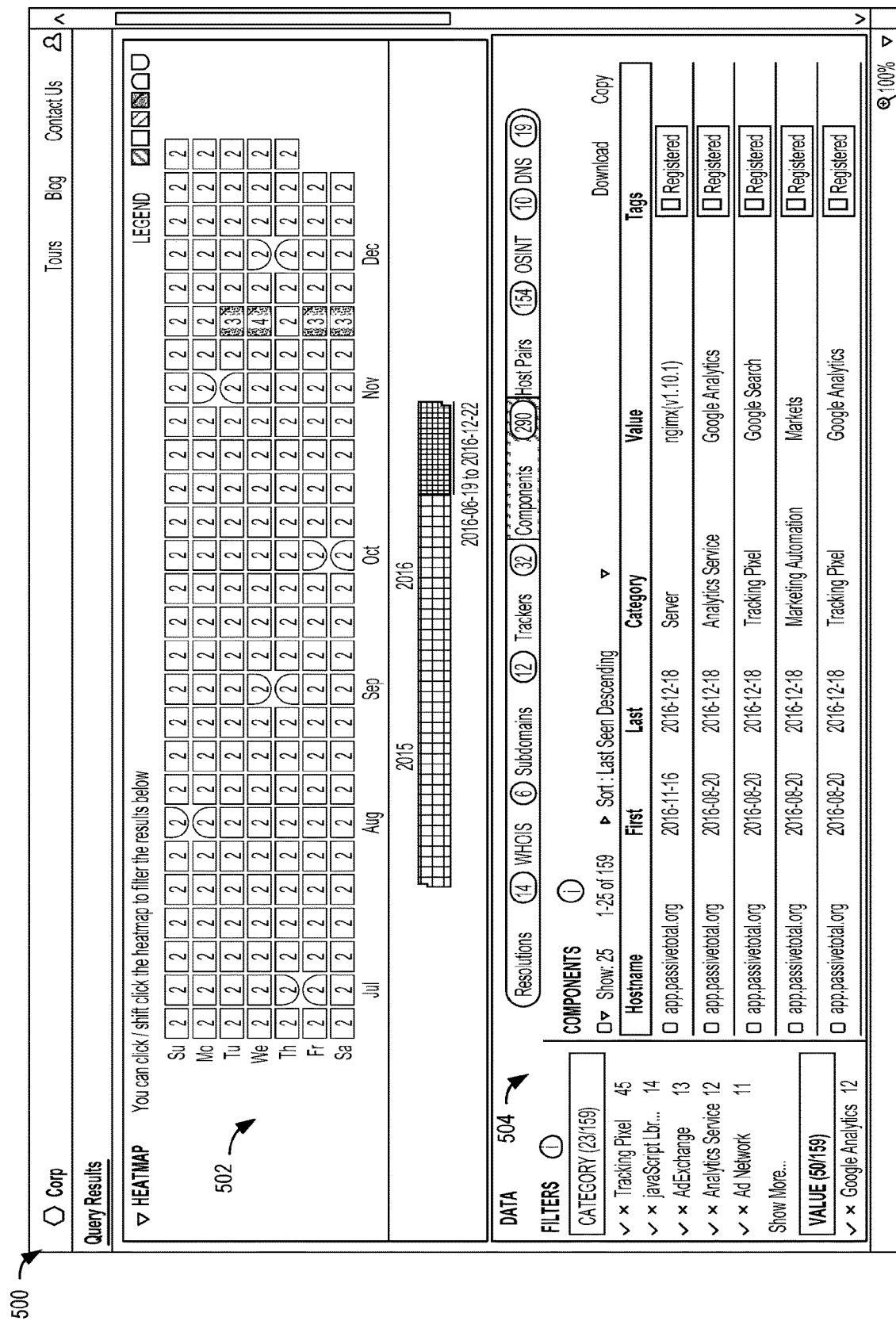

Now turning to FIG. 5 is a graphical interface 500 for displaying information about web components identified in a document. Graphical interface 500 may include a graphical interface 502, which may provide information about network activity. The example shown in FIG. 5 illustrates graphical interface 502 of a heat map of network activity for a web site includes multiple documents. Graphical interface 502 may be included in an application, such as RiskIQ PassiveTotal™. Graphical interface 502 may include graphical interface 504 for displaying information about web components. Graphical interface 504 is an example of graphical interface 404 shown with reference to FIG. 4. In this example, graphical interface 504 shows information about web components detected for multiple documents, such as multiple web pages of a website.

Figure 6:
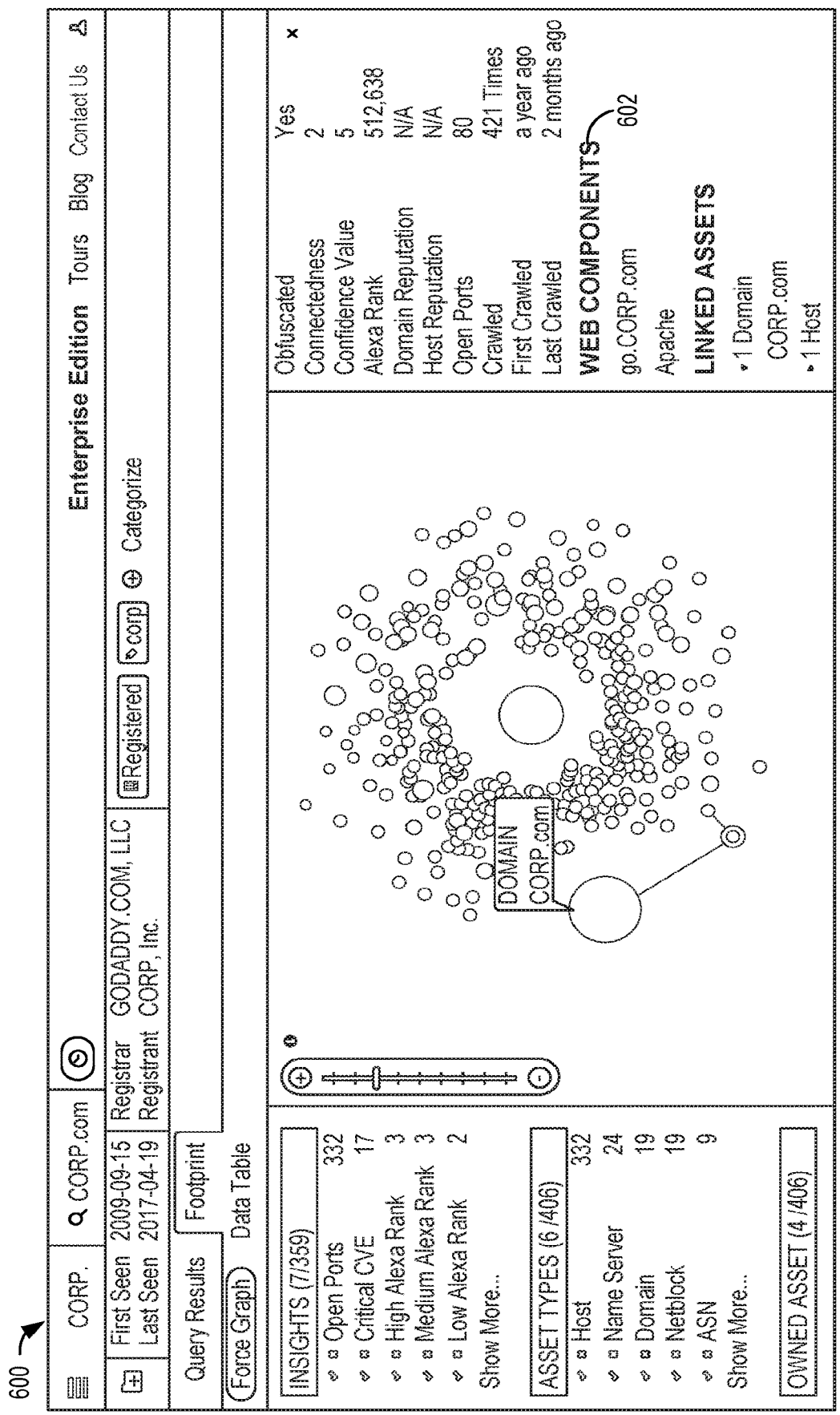

FIG. 6 illustrates a graphical interface 600 for displaying information about web components identified for a web domain. The graphical interface 600 may be displayed as part of an application or service that displays a digital footprint of network assets connected to an asset, such as a network domain. For example, the graphical interface 600 may be displayed as part of a RiskIQ Digital Footprint™ service. Graphical interface 600 may be interactive to receive input to specify a network asset for which a footprint is to be displayed. Using the network asset (e.g., a domain name), network analysis system can determine one or more documents that define one or more websites for the domain. The documents may be processed using techniques disclosed in FIG. 2 to determine information about web frameworks and/or web components of the documents. In the example shown in FIG. 6, graphical interface 600 may include a graphical interface 602 that displays information about one or more web components detected for documents of the domain. For example, the documents may correspond to web pages associated with or part of the domain. Each of the web components may be distinct and associated with one or more web frameworks.

Figure 7:
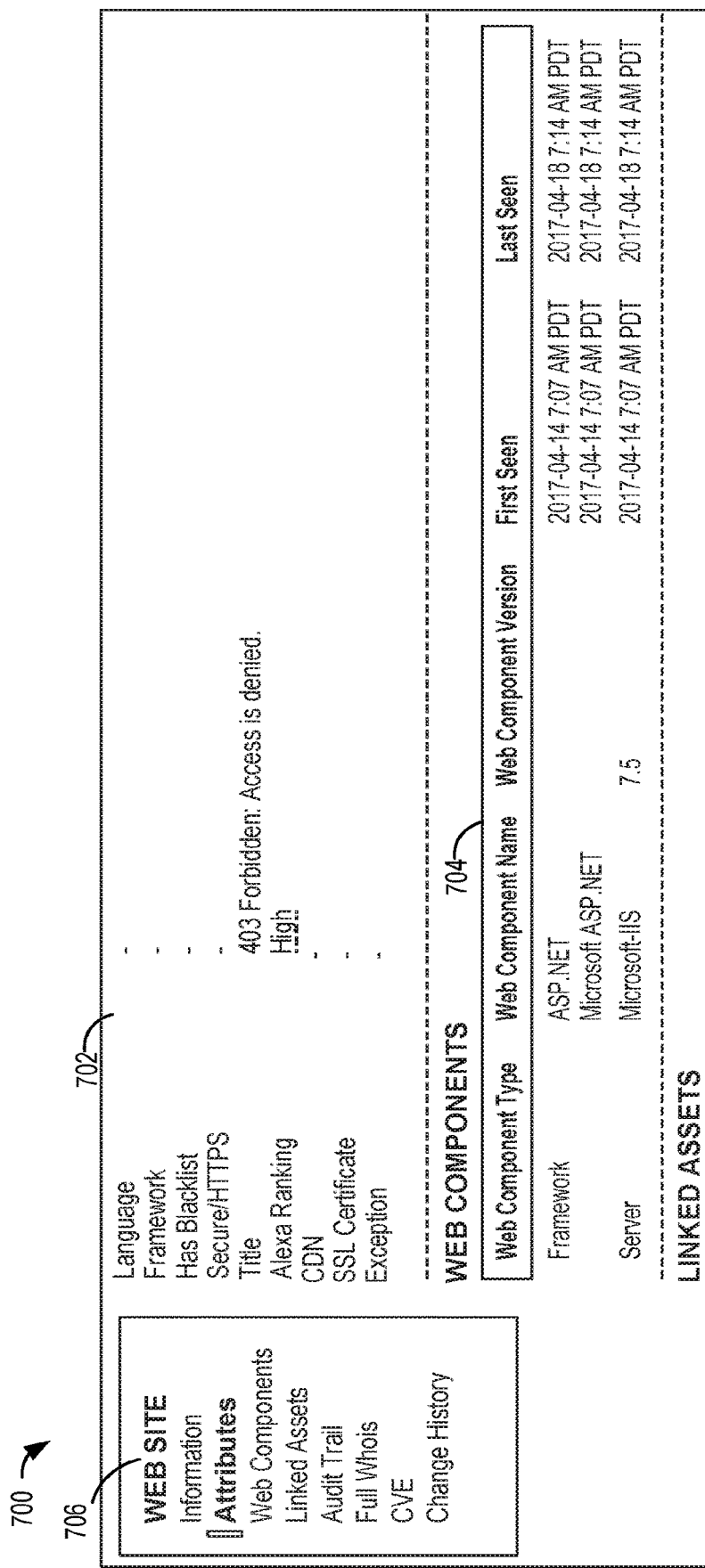

FIG. 7 illustrates a graphical interface 700 for displaying information about web components. Graphical interface 700 may be displayed with information about documents processed for a website. Graphical interface 700 may include graphical interface 704 for displaying information about web components identified in documents for a website. Graphical interface 704 may be displayed in response to or based on interaction with graphical interface 706 included in graphical interface 700. Graphical interface 706 may be interactive to request to display attributes about a web site, including web components identified on the web site. Interaction with graphical interface 706 may cause graphical interface 704 to be included in graphical interface 700. Graphical interface 704 may provide information about a website, including information obtained from one or more third party sources.

In the example shown in FIG. 7, graphical interface 704 displays data records about one or more web components. In the example, each data record is displayed including a type of web component for the web components identified in a document for the website. In this example, one web component type of a web framework including multiple web components. In some embodiments, the information about web components and web frameworks may include a version of those items. In some embodiments, information about web components and/or web frameworks may be queried from a third party source. For example, security information, such as a CVE score may be obtained for each of the web components and web frameworks displayed. The information may be displayed accordingly with the corresponding web component and/or web framework.

Computer Systems for Network Analysis System and Client System

Figure 8:
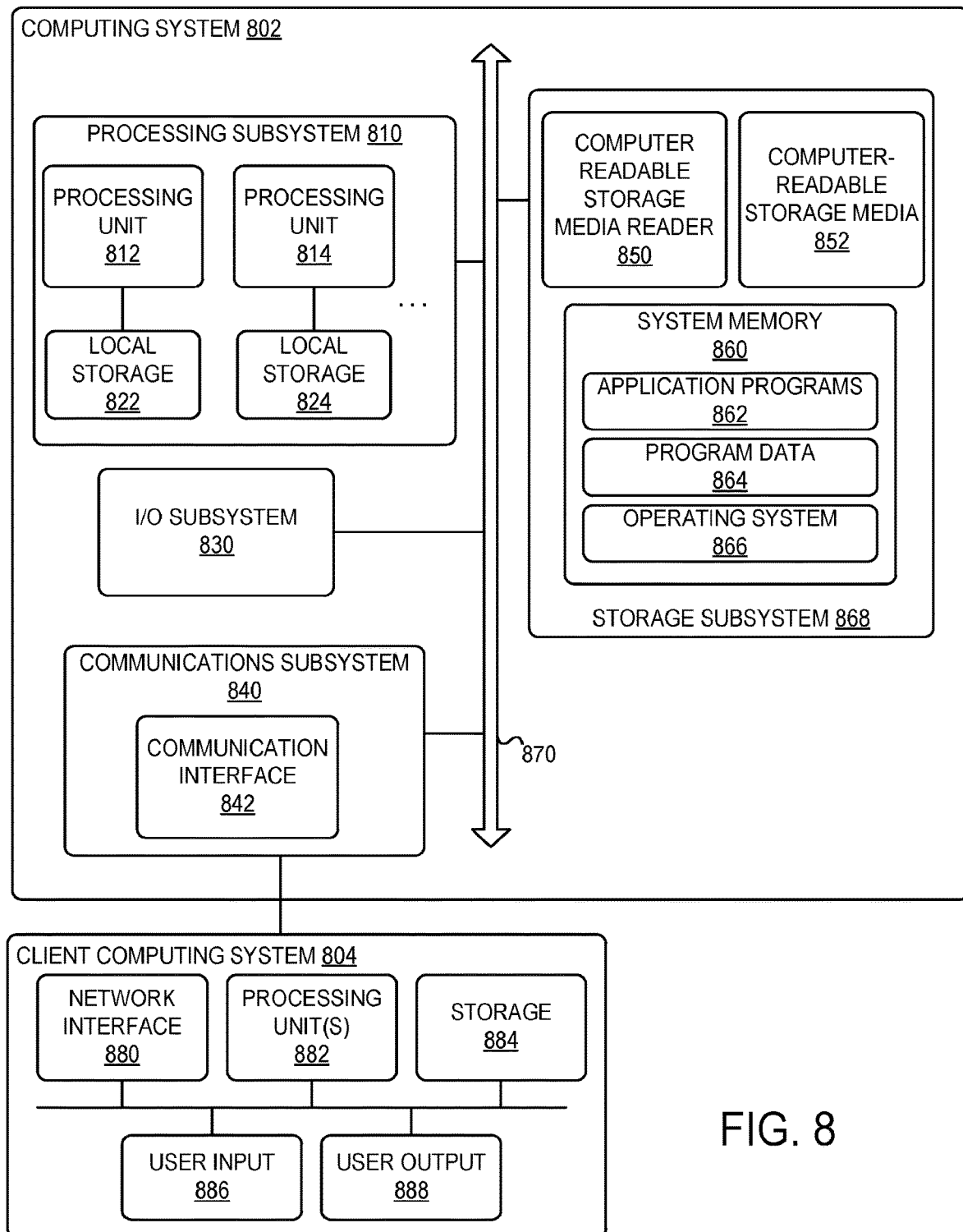
FIG. 8 shows a simplified block diagram of a computing system and a client computing system usable to implement some embodiments.

Various operations described herein may be implemented on computer systems, which may be of generally conventional design. FIG. 8 shows a simplified block diagram of a representative computing system 802 and client computing system 804 usable to implement certain embodiments of the present disclosure. In various embodiments, computing system 802 or similar systems may implement network analysis system 120, or any other computing system described herein or portions thereof. Client computing system 804 or similar systems may implement client system 104, or other client systems described herein.

Computing system 802 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 802 may include processing subsystem 810. Processing subsystem 810 may communicate with a number of peripheral systems via bus subsystem 870. These peripheral systems may include I/O subsystem 830, storage subsystem 868, and communications subsystem 840.

Bus subsystem 870 provides a mechanism for letting the various components and subsystems of server computing system 804 communicate with each other as intended. Although bus subsystem 870 is shown schematically as a single bus, alternative embodiments of the bus subsystem may utilize multiple buses. Bus subsystem 870 may form a local area network that supports communication in processing subsystem 810 and other components of server computing system 820. Bus subsystem 870 may be implemented using various technologies including server racks, hubs, routers, etc. Bus subsystem 870 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 830 may include devices and mechanisms for inputting information to computing system 802 and/or for outputting information from or via computing system 802. In general, use of the term "input device" is intended to include all possible types of devices and mechanisms for inputting information to computing system 802. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 802 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 810 controls the operation of computing system 802 and may comprise one or more processing units 812, 814, etc. A processing unit may include one or more processors, including single core processor or multicore processors, one or more cores of processors, or combinations thereof. In some embodiments, processing subsystem 810 may include one or more special purpose co-processors such as graphics processors, digital signal processors (DSPs), or the like. In some embodiments, some or all of the processing units of processing subsystem 810 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 822, 824. Any type of processors in any combination may be included in processing unit(s) 812, 814.

In some embodiments, processing subsystem 810 may be implemented in a modular design that incorporates any number of modules (e.g., blades in a blade server implementation). Each module may include processing unit(s) and local storage. For example, processing subsystem 810 may include processing unit 812 and corresponding local storage 822, and processing unit 814 and corresponding local storage 824.

Local storage 822, 824 may include volatile storage media (e.g., conventional DRAM, SRAM, SDRAM, or the like) and/or non-volatile storage media (e.g., magnetic or optical disk, flash memory, or the like). Storage media incorporated in local storage 822, 824 may be fixed, removable or upgradeable as desired. Local storage 822, 824 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 812, 814 need at runtime. The ROM may store static data and instructions that are needed by processing unit(s) 812, 814. The permanent storage device may be a non-volatile read-and-write memory device that may store instructions and data even when a module including one or more processing units 812, 814 and local storage 822, 824 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 822, 824 may store one or more software programs to be executed by processing unit(s) 812, 814, such as an operating system and/or programs implementing various server functions such as functions of network analysis system 120, or any other server(s) associated with network analysis system 120. "Software" refers generally to sequences of instructions that, when executed by processing unit(s) 812, 814 cause computing system 802 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 812, 814. In some embodiments the instructions may be stored by storage subsystem 868 (e.g., computer readable storage media). In various embodiments, the processing units may execute a variety of programs or code instructions and may maintain multiple concurrently executing programs or processes. At any given time, some or all of the program code to be executed may be resident in local storage 822, 824 and/or in storage subsystem including potentially on one or more storage devices. Software may be implemented as a single program or a collection of separate programs or program modules that interact as desired. From local storage 822, 824 (or non-local storage described below), processing unit(s) 812, 814 may retrieve program instructions to execute and data to process in order to execute various operations described above.

Storage subsystem 868 provides a repository or data store for storing information that is used by computing system 802. Storage subsystem 868 provides a tangible non-transitory computer-readable storage medium for storing the basic programming and data constructs that provide the functionality of some embodiments. Software (programs, code modules, instructions) that when executed by processing subsystem 810 provide the functionality described above may be stored in storage subsystem 868. The software may be executed by one or more processing units of processing subsystem 810. Storage subsystem 868 may also provide a repository for storing data used in accordance with the present disclosure.

Storage subsystem 868 may include one or more non-transitory memory devices, including volatile and non-volatile memory devices. As shown in FIG. 8, storage subsystem 868 includes a system memory 860 and a computer-readable storage media 852. System memory 860 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 802, such as during start-up, may typically be stored in the ROM. The RAM typically contains data and/or program modules that are presently being operated and executed by processing subsystem 810. In some implementations, system memory 860 may include multiple different types of memory, such as static random access memory (SRAM) or dynamic random access memory (DRAM). Storage subsystem 868 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 868.

By way of example, and not limitation, as depicted in FIG. 8, system memory 860 may store application programs 862, which may include client applications, Web browsers, mid-tier applications, relational database management systems (RDBMS), etc., program data 864, and one or more operating systems 866. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 852 may store programming and data constructs that provide the functionality of some embodiments. Software (programs, code modules, instructions) that when executed by processing subsystem 810 a processor provide the functionality described above may be stored in storage subsystem 868. By way of example, computer-readable storage media 852 may include non-volatile memory such as a hard disk drive, a magnetic disk drive, an optical disk drive such as a CD ROM, DVD, a Blu-Ray® disk, or other optical media. Computer-readable storage media 852 may include, but is not limited to, Zip® drives, flash memory cards, universal serial bus (USB) flash drives, secure digital (SD) cards, DVD disks, digital video tape, and the like. Computer-readable storage media 852 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 852 may provide storage of computer-readable instructions, data structures, program modules, and other data for computing system 802.

In certain embodiments, storage subsystem 868 may also include a computer-readable storage media reader 850 that may further be connected to computer-readable storage media 852. Together and, optionally, in combination with system memory 860, computer-readable storage media 852 may comprehensively represent remote, local, fixed, and/or removable storage devices plus storage media for storing computer-readable information.

In certain embodiments, computing system 802 may provide support for executing one or more virtual machines. Computing system 802 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 802. Accordingly, multiple operating systems may potentially be run concurrently by computing system 802. Each virtual machine generally runs independently of the other virtual machines.

Communication subsystem 840 provides an interface to other computer systems and networks. Communication subsystem 840 serves as an interface for receiving data from and transmitting data to other systems from computing system 802. For example, communication subsystem 840 may enable computing system 802 to establish a communication channel to one or more client computing devices via the Internet for receiving and sending information from and to the client computing devices.

Communication subsystem 840 may support both wired and/or wireless communication protocols. For example, in certain embodiments, communication subsystem 840 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 840 may provide wired network connectivity (e.g., Ethernet) in addition to or instead of a wireless interface.

Communication subsystem 840 may receive and transmit data in various forms. For example, in some embodiments, communication subsystem 840 may receive input communication in the form of structured and/or unstructured data feeds, event streams, event updates, and the like. For example, communication subsystem 840 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 840 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 840 may also be configured to output the structured and/or unstructured data feeds, event streams, event updates, and the like to one or more databases that may be in communication with one or more streaming data source computers coupled to computing system 802.

Communication subsystem 840 may provide a communication interface 842, e.g., a WAN interface, which may provide data communication capability between the local area network (bus subsystem 870) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 802 may operate in response to requests received via communication interface 842. Further, in some embodiments, communication interface 842 may connect computing systems 802 to each other, providing scalable systems capable of managing high volumes of activity. Conventional or other techniques for managing server systems and server farms (collections of server systems that cooperate) may be used, including dynamic resource allocation and reallocation.

Computing system 802 may interact with various user-owned or user-operated devices via a wide-area network such as the Internet. An example of a user-operated device is shown in FIG. 8 as client computing system 802. Client computing system 804 may be implemented, for example, as a consumer device such as a smart phone, other mobile phone, tablet computer, wearable computing device (e.g., smart watch, eyeglasses), desktop computer, laptop computer, and so on.

For example, client computing system 804 may communicate with computing system 802 via communication interface 842. Client computing system 804 may include conventional computer components such as processing unit(s) 882, storage device 884, network interface 880, user input device 886, and user output device 888. Client computing system 804 may be a computing device implemented in a variety of form factors, such as a desktop computer, laptop computer, tablet computer, smart phone, other mobile computing device, wearable computing device, or the like.

Processing unit(s) 882 and storage device 884 may be similar to processing unit(s) 812, 814 and local storage 822, 824 described above. Suitable devices may be selected based on the demands to be placed on client computing system 804; for example, client computing system 804 may be implemented as a "thin" client with limited processing capability or as a high-powered computing device. Client computing system 804 may be provisioned with program code executable by processing unit(s) 882 to enable various interactions with computing system 802 of a message management service such as accessing messages, performing actions on messages, and other interactions described above. Some client computing systems 804 may also interact with a messaging service independently of the message management service.

Network interface 880 may provide a connection to a wide area network (e.g., the Internet) to which communication interface 840 of computing system 802 is also connected. In various embodiments, network interface 880 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 886 may include any device (or devices) via which a user may provide signals to client computing system 804; client computing system 804 may interpret the signals as indicative of particular user requests or information. In various embodiments, user input device 886 may include any or all of a keyboard, touch pad, touch screen, mouse or other pointing device, scroll wheel, click wheel, dial, button, switch, keypad, microphone, and so on.

User output device 888 may include any device via which client computing system 804 may provide information to a user. For example, user output device 888 may include a display to display images generated by or delivered to client computing system 804. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 888 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 812, 814 and 882 may provide various functionality for computing system 802 and client computing system 804, including any of the functionality described herein as being performed by a server or client, or other functionality associated with message management services.

It will be appreciated that computing system 802 and client computing system 804 are illustrative and that variations and modifications are possible. Computer systems used in connection with embodiments of the present disclosure may have other capabilities not specifically described here. Further, while computing system 802 and client computing system 804 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

While the present disclosure has been described with respect to specific embodiments, one skilled in the art will recognize that numerous modifications are possible. For instance, although specific processes are described with reference to FIGS. 2 and 3, other processes may be implemented. Embodiments of the present disclosure may be realized using a variety of computer systems and communication technologies including but not limited to specific examples described herein.

Embodiments of the present disclosure may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the present disclosure has been described with respect to specific embodiments, it will be appreciated that the present disclosure is intended to cover all modifications and equivalents within the scope of the following claims.

What is claimed is:

1. A method, comprising:
processing a structure of a web document;
identifying a web framework for the web document;
storing information related to the web framework;
periodically processing the structure of the web document to identify changes to the web framework;
upon identifying a change to the web framework, storing information related to the change to the web framework as a version change for the web framework; and
causing display of information associated with one or more versions of the web framework and security information associated with an evaluation of the one or more versions of the web framework.

2. The method of claim 1, further comprising:
generating a hash signature for each of a plurality of web components that are included in the web framework by applying a hash function to the respective web component;
wherein storing the information comprises:
storing the hash signature for each of the plurality of web components that are included in the web framework and an indication of a version of the web framework that includes the respective web component.

3. The method of claim 1, further comprising:
accessing the web document by crawling a web site that includes the web document.

4. The method of claim 1, wherein identifying the web framework for the web document comprises:
initiating requests for web components associated with the web document;
receiving responses to the requests, the responses including the web components;
generating first hash signatures for the respective web components that are included in the responses by applying a hash function to each of the web components; and
identifying the web framework by comparing the first hash signatures to second hash signatures of known web components that are included in the web framework.

5. The method of claim 4, wherein identifying the web framework comprises:
comparing the first hash signatures to second hash signatures of each of a plurality of web frameworks, the second hash signatures of each web framework being associated with respective known web components that are included in the respective web framework; and
identifying the web framework based on an extent to which the first hash signatures match the second hash signatures of the web framework being no less than an extent to which the first hash signatures match the second hash signatures of any other web framework of the plurality of web frameworks.

6. The method of claim 4, wherein identifying the web framework comprises:
identifying the web framework based on the first hash signatures being same as the respective second hash signatures of the known web components that are included in the web framework.

7. The method of claim 4, wherein identifying the web framework comprises:
identifying the web framework based on a number of the first hash signatures that match a respective second hash signature of a respective known web component in the web framework is greater than or equal to a threshold number.

8. The method of claim 4, wherein identifying the web framework comprises:
not comparing the first hash signatures to third hash signatures of known web components that are included in a second web framework based on the second web framework having a statistical significance that is less than a statistical threshold.

9. A system, comprising:
memory; and
one or more processors coupled to the memory, the one or more processors configured to:
process a structure of a web document;
identify a web framework for the web document;
store information related to the web framework in the memory;
periodically process the structure of the web document to identify changes to the web framework;
based on identification of a change to the web framework, store, in the memory, information related to the change to the web framework as a version change for the web framework; and
cause display of information associated with one or more versions of the web framework and security information associated with an evaluation of the one or more versions of the web framework.

10. The system of claim 9, wherein the one or more processors are configured to:
generate a hash signature for each of a plurality of web components that are included in the web framework by applying a hash function to the respective web component; and
store, in the memory, the hash signature for each of the plurality of web components that are included in the web framework and an indication of a version of the web framework that includes the respective web component.

11. The system of claim 9, wherein the one or more processors are further configured to:
access the web document by crawling a website that includes the web document.

12. The system of claim 9, wherein the one or more processors are configured to:
initiate requests for web components associated with the web document;
receive responses to the requests, the responses including the web components;

generate first hash signatures for the respective web components that are included in the responses by applying a hash function to each of the web components; and identify the web framework by comparing the first hash signatures to second hash signatures of known web components that are included in the web framework.

13. The system of claim 12, wherein the one or more processors are configured to:

compare the first hash signatures to second hash signatures of each of a plurality of web frameworks, the second hash signatures of each web framework being associated with respective known web components that are included in the respective web framework; and identify the web framework based on an extent to which the first hash signatures match the second hash signatures of the web framework being no less than an extent to which the first hash signatures match the second hash signatures of any other web framework of the plurality of web frameworks.

14. The system of claim 12, wherein the one or more processors are configured to:

identify the web framework based on the first hash signatures being same as the respective second hash signatures of the known web components that are included in the web framework.

15. The system of claim 12, wherein the one or more processors are configured to:

identify the web framework based on a number of the first hash signatures that match a respective second hash signature of a respective known web component in the web framework is greater than or equal to a threshold number.

16. The system of claim 12, wherein the one or more processors are configured to:

not compare the first hash signatures to third hash signatures of known web components that are included in a second web framework based on the second web framework having a statistical significance that is less than a statistical threshold.

17. A computer program product comprising a non-transitory computer-readable storage medium having instructions recorded thereon for enabling a processor-based system to perform operations, the operations comprising:

processing a structure of a web document;

identifying a web framework for the web document;

storing information related to the web framework;

periodically processing the structure of the web document to identify changes to the web framework;

upon identifying a change to the web framework, storing information related to the change to the web framework as a version change for the web framework; and causing display of information associated with one or more versions of the web framework and security information associated with an evaluation of the one or more versions of the web framework.

18. The computer program product of claim 17, wherein the operations comprise:

generating a hash signature for each of a plurality of web components that are included in the web framework by applying a hash function to the respective web component; and storing the hash signature for each of the plurality of web components that are included in the web framework and an indication of a version of the web framework that includes the respective web component.

19. The computer program product of claim 17, wherein the operations comprise:

initiating requests for web components associated with the web document;

receiving responses to the requests, the responses including the web components;

generating first hash signatures for the respective web components that are included in the responses by applying a hash function to each of the web components; and identifying the web framework by comparing the first hash signatures to second hash signatures of known web components that are included in the web framework.

20. The computer program product of claim 19, wherein identifying the web framework comprises:

comparing the first hash signatures to second hash signatures of each of a plurality of web frameworks, the second hash signatures of each web framework being associated with respective known web components that are included in the respective web framework; and identifying the web framework based on an extent to which the first hash signatures match the second hash signatures of the web framework being no less than an extent to which the first hash signatures match the second hash signatures of any other web framework of the plurality of web frameworks.

\* \* \* \* \*